United States Patent
Kashima et al.

(10) Patent No.: US 10,222,240 B2
(45) Date of Patent: Mar. 5, 2019

(54) RESOLVER, ROTATING ELECTRICAL MACHINE, AND ELEVATOR HOISTING MACHINE

(71) Applicant: Mitsubishi Electric Corporation, Chiyoda-ku (JP)

(72) Inventors: Shunta Kashima, Chiyoda-ku (JP); Toshinori Tanaka, Chiyoda-ku (JP); Morishige Minobe, Chiyoda-ku (JP); Satoru Nakada, Chiyoda-ku (JP); Ryuichi Takiguchi, Chiyoda-ku (JP); Takanori Komatsu, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/578,742

(22) PCT Filed: Jun. 5, 2015

(86) PCT No.: PCT/JP2015/066361
§ 371 (c)(1),
(2) Date: Dec. 1, 2017

(87) PCT Pub. No.: WO2016/194227
PCT Pub. Date: Dec. 8, 2016

(65) Prior Publication Data
US 2018/0172479 A1 Jun. 21, 2018

(51) Int. Cl.
*G01D 5/20* (2006.01)
*B66B 5/00* (2006.01)
*B66B 11/04* (2006.01)

(52) U.S. Cl.
CPC ......... *G01D 5/2046* (2013.01); *B66B 5/0018* (2013.01); *B66B 11/043* (2013.01); *G01D 5/2086* (2013.01)

(58) Field of Classification Search
CPC .... G01D 5/2086; B66B 11/043; B66B 5/0018
See application file for complete search history.

(56) References Cited

U.S. PATENT DOCUMENTS

2009/0261683 A1* 10/2009 Sadiku ............... H02K 3/12
310/207
2011/0074400 A1   3/2011 Nakano et al.
(Continued)

FOREIGN PATENT DOCUMENTS

EP   1416254 A1   5/2004
JP   2004-151040 A   5/2004
(Continued)

OTHER PUBLICATIONS

International Search Report dated Jul. 21, 2015 in PCT/JP2015/066361, filed on Jun. 5, 2015.

*Primary Examiner* — Jermele M Hollington
*Assistant Examiner* — Alvaro Fortich
(74) *Attorney, Agent, or Firm* — Xsensus LLP

(57) ABSTRACT

In a resolver, a detecting stator core includes a first detection winding group, a second detection winding group, and a plurality of excitation windings. The first detection winding group includes a plurality of first windings as detection windings. The second detection winding group includes, as detection windings, a plurality of second windings different from the first windings in the phase of the detection voltage. The excitation windings are each wound around one of teeth of the detecting stator core. Each first winding and each second winding are wound around different teeth from each other without being wound around the same tooth. The detection winding and the excitation winding that are wound around the same tooth are arranged so as to be separated from each other in a radial direction.

19 Claims, 16 Drawing Sheets

(56) References Cited

U.S. PATENT DOCUMENTS

2012/0274172 A1* 11/2012 Koga ...................... H02K 3/12
　　　　　　　　　　　　　　　　　　　　　　　　310/208
2014/0070649 A1* 3/2014 Fulton .................. G01D 5/2046
　　　　　　　　　　　　　　　　　　　　　　　　　310/91

FOREIGN PATENT DOCUMENTS

| JP | 2007-288961 A | 11/2007 |
| JP | 2012-005327 A | 1/2012 |
| JP | 2012-163359 A | 8/2012 |
| JP | 2013-247828 A | 12/2013 |
| WO | 2009/145085 A1 | 12/2009 |
| WO | 2015/087381 A1 | 6/2015 |
| WO | 2016/063324 A1 | 4/2016 |

* cited by examiner

FIG. 12

| | MULTIPLICATION FACTOR N OF ANGLE | NUMBER OF TOOTH 2M | EXCITATION WINDING ORDER M | SPATIAL ORDER OF NUMBER OF TURNS DISTRIBUTION (PARENTHESIZED VALUE INDICATES EQUIVALENT ORDER) | |
|---|---|---|---|---|---|
| | | | | $\lvert M \pm N \rvert$ | $\lvert M - \lvert M \pm N \rvert \rvert$ |
| EXAMPLE 1-1 | 20 | 30 | 15 | 35(5),5 | 15,3 |
| EXAMPLE 1-2 | 10 | 30 | 15 | 25(5),5 | 10 |
| EXAMPLE 1-3 | 15 | 18 | 9 | 24(6),6 | 15,3 |
| EXAMPLE 1-4 | 24 | 18 | 9 | 33(3),15(3) | 24,6 |
| EXAMPLE 1-5 | 30 | 18 | 9 | 39(3),21(3) | 30,12 |

RESOLVER, ROTATING ELECTRICAL MACHINE, AND ELEVATOR HOISTING MACHINE

TECHNICAL FIELD

The present invention relates to a resolver including a detecting stator and a detecting rotor rotatable relative to the detecting stator, a rotating electrical machine including a resolver, and an elevator hoisting machine including a resolver.

BACKGROUND ART

Hitherto, there has been known a resolver in which an excitation winding and a sine-phase output winding and a cosine-phase output winding, which differ from each other in the electrical angle phase of the output voltage by 90°, are wound around each of the teeth of a stator core, and the excitation winding, the sine-phase output winding, and the cosine-phase output winding are arranged on the same tooth so that the excitation winding is separated from the sine-phase output winding and cosine-phase output winding in a direction in which the tooth protrudes, by a partition wall of an insulating member (see, for example, Patent Literature 1).

CITATION LIST

Patent Literature

[PTL 1] JP 2012-163359 A

SUMMARY OF INVENTION

Technical Problem

In the resolver of the related art described in Patent Literature 1, however, the sine-phase output winding and cosine-phase output winding are wound in such a way that the outer rim of one is overlapped with the other, which easily leads to accidental unwinding of the outer output winding and an error in the detection of the output winding angle. Patent Literature 1 also includes a description of another arrangement in which the sine-phase output winding and the cosine-phase output winding are separated from each other in the direction in which the tooth protrudes. In this case too, the sine-phase output winding, the cosine-phase output winding, and the excitation winding are side by side in the direction in which the tooth protrudes and, unless the length of the tooth is adapted, the resultant thinness of the partition walls of the insulating member easily leads to accidental unwinding of the windings due to deformation of the partition walls. The width of each winding in the direction in which the tooth protrudes may be reduced in order to ensure that the partition walls of the insulating member are sufficiently thick, but the windings are still prone to accidental unwinding because the thickness of each winding in the circumferential direction is thicker in this case.

The present invention has been made to solve the problems described above, and an object of the present invention is therefore to provide a resolver, a rotating electrical machine, and an elevator hoisting machine, which are capable of preventing an increase in angle detection error.

Solution to Problem

According to one embodiment of the present invention, there is provided a resolver, including: a detecting stator; and a detecting rotor rotatable relative to the detecting stator, the detecting rotor including a plurality of salient poles arranged side by side in a circumferential direction, and being arranged so that each of the plurality of salient poles faces the detecting stator in a radial direction, the detecting stator including a detecting stator core, and a first detection winding group, a second detection winding group and a plurality of excitation windings, which are provided to the detecting stator core, the detecting stator core including a plurality of teeth arranged side by side in the circumferential direction, the first detection winding group including a plurality of first windings as detection windings, the second detection winding group including, as detection windings, a plurality of second windings different from the plurality of first windings in a phase of a detection voltage, each of the plurality of excitation windings being wound around each one of the plurality of teeth, each of the plurality of first windings and each of the plurality of second windings being wound around different ones of the plurality of teeth from each other without being wound around the same tooth, each of the detection windings and each of the plurality of excitation windings wound around the same tooth being arranged so as to be separated from each other in the radial direction.

Advantageous Effects of Invention

According to the resolver, rotating electrical machine, and elevator hoisting machine of the present invention, each first winding and each second winding are wound around different teeth from each other, without being wound around the same tooth, and the excitation winding and the detection winding that are wound around the same tooth are arranged so as to be separated from each other in the radial direction of the detecting stator. The excitation windings, the first windings, and the second windings can be thus prevented from being wound in an undesirable manner in which the outer rim of one type of winding is overlapped with another type of winding. In addition, the need to increase the thickness of each type of winding in the circumferential direction of the detecting stator can be eliminated by avoiding winding all types of windings, that is, the excitation windings, the first windings, and the second windings, around the same tooth. This can reduce the chance of conductive wires of the excitation windings, the first windings, and the second windings being wound around teeth in a misaligned manner, and prevent an angle detection error of the resolver from increasing.

BRIEF DESCRIPTION OF DRAWINGS

FIG. 12 is a table for showing combinations of the number of teeth, the number of salient poles, and the order of excitation windings in Example 1-1 to Example 1-5 of the present invention.

DESCRIPTION OF EMBODIMENTS

Now, exemplary embodiments of the present invention are described with reference to the drawings.

First Embodiment

Figure 1:
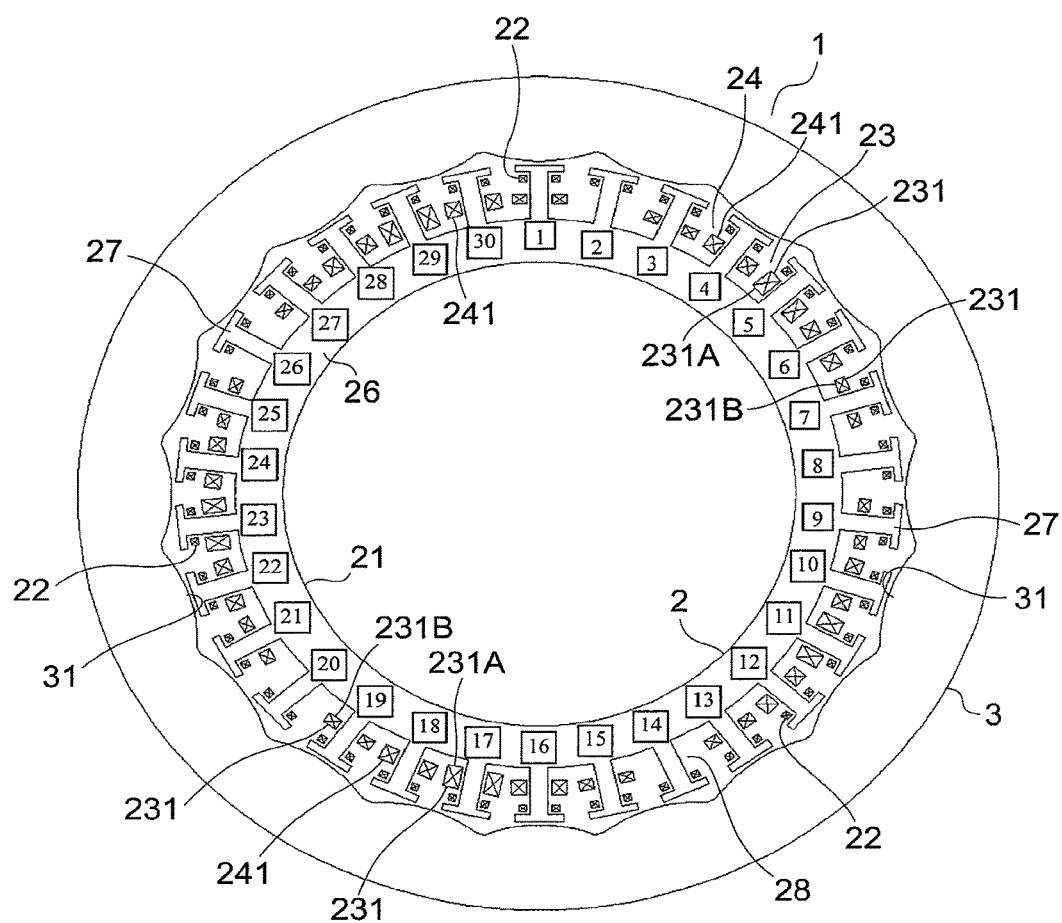
FIG. 1 is a front view for illustrating a resolver according to a first embodiment of the present invention.

FIG. 1 is a front view for illustrating a resolver according to a first embodiment of the present invention. A resolver 1 includes a detecting stator 2 and a detecting rotor 3, which is a magnetic body rotatable relative to the detecting stator 2. The resolver 1 used in this example is an outer rotor-type resolver in which the detecting stator 2 is disposed on the inside in a radial direction of the ring-shaped detecting rotor 3.

The detecting stator 2 includes a detecting stator core 21, which is a magnetic body, a first detection winding group 23, a second detection winding group 24, and a plurality of excitation windings 22, which are provided on the detecting stator core 21, and an insulator (not shown), which is a non-magnetic body interposed between each of the first detection winding group 23, the second detection winding group 24, and the excitation windings 22 and the detecting stator core 21. The state of insulation between each of the first detection winding group 23, the second detection winding group 24, and the excitation windings 22 and the detecting stator core 21 is ensured by the insulator and by insulating coating of conductive wires included in the windings.

The detecting stator core 21 includes a core back 26, which has a ring shape, and a plurality of teeth 27, which are arranged side by side in a circumferential direction of the detecting stator core 21, and which protrude from the core back 26 outward in a radial direction of the core back 26 toward the detecting rotor 3. In this example, thirty teeth 27 are equally spaced in the circumferential direction of the detecting stator core 21. A slot 28, which is a groove open to the detecting rotor 3, is formed between one tooth 27 and another tooth 27. In FIG. 1, numbers (numbers each framed by a square frame) continuous in the circumferential direction are assigned to the respective teeth 27 as tooth numbers for convenience.

Each of the excitation windings 22 is wound around one of the teeth 27. The excitation windings 22 are electrically connected to one another in series.

The first detection winding group 23 has a plurality of first windings 231 as detection windings. The first windings 231 are electrically connected to one another in series. This makes the first windings 231 detection windings all having the same phase. The second detection winding group 24 has a plurality of second windings 241 as detection windings. The second windings 241 are electrically connected to one another in series. This makes the second windings 241 detection windings all having the same phase.

The first windings 231 and the second windings 241 are detection windings different from each other in the electrical angle phase of the detection voltage. In this example, the first windings 231 serve as COS phase detection windings and the second windings 241 serve as SIN phase detection windings. In other words, the first windings 231 and the second windings 241 are windings configured to detect phases electrically different from each other by 90°.

Each of the first windings 231 and each of the second windings 241 are wound around different teeth 27 from each other, without being wound around the same tooth 27. The first windings 231 and the second windings 241 are provided on the detecting stator core 21 so as to avoid providing detection windings of the same phase in two teeth 27 adjacent to each other on the circumferential direction of the detecting stator core 21. In this example, the first windings 231 are wound around teeth 27, which are selected every other tooth 27 in the circumferential direction out of the plurality of teeth 27, and the second winding 241 is wound around at least one of the plurality of remaining teeth 27, which are not the teeth 27 wound with the first windings 231.

The detecting rotor 3 includes a plurality of salient poles 31 arranged side by side in a circumferential direction of the detecting rotor 3. In this example, twenty salient poles 31 are equally spaced in the circumferential direction of the detecting rotor 3. The detecting rotor 3 is arranged so as to be coaxial with the detecting stator 2, with the salient poles 31 facing an outer circumferential surface of the detecting stator 2 in a radial direction. When the detecting rotor 3 rotates relative to the detecting stator 2, the pulsation of permeance between the detecting rotor 3 and the detecting stator 2 is changed in a sine wave pattern by the presence of the salient poles 31.

A magnetomotive force is generated in each excitation winding 22 by a supply of alternating current power to the excitation winding 22. This generates a magnetic flux that passes through the detecting rotor 3 and the detecting stator core 21. The magnetic flux interlinks the first windings 231 and the second windings 241, thereby generating voltages in the first windings 231 and the second windings 241. The permeance between the detecting rotor 3 and the detecting stator 2 changes in a sine wave pattern based on the rotation angle of the detecting rotor 3, which means that the rotation angle of the detecting rotor 3 is detected by measuring a voltage output from the first windings 231 and a voltage output from the second windings 241.

Conductive wires of the excitation windings 22 are wound around all the teeth 27 at the same number of turns so that the winding directions on the teeth 27 adjacent to each other are opposite from each other. This gives the same winding width in the radial direction of the detecting stator 2 (i.e., a direction in which each tooth 27 protrudes), namely, the same radial winding width, to every excitation winding 22. This also gives the same position in the radial direction of the detecting stator 2, namely, the same radial position, to every excitation winding 22.

The first detection winding group 23 is an adjustment winding group including two types of first windings 231, which differ from each other in the winding width in the radial direction of the detecting stator 2, namely, the radial winding width. In the first detection winding group 23, a plurality of first windings 231 of which the radial winding width is largest of all the first windings 231 are referred to as maximum width windings 231A, and a plurality of first windings 231 out of all first windings 231 that are smaller than the maximum width windings 231A in radial winding width are referred to as non-maximum width windings 231B. A conductive wire of each maximum width winding 231A has a number of turns higher than that of a conductive wire of each non-maximum width winding 231B. The maximum width windings 231A are forward direction windings wound in a forward direction, and the non-maximum width windings 231B are reverse direction windings wound in a direction reverse to the winding direction of the forward direction windings. The first windings 231 are divided into the two types in order to adjust an offset.

In the second detection winding group 24, on the other hand, every second winding 241 has the same winding width in the radial direction of the detecting stator 2, namely, the same radial winding width. This makes the number of turns of a conductive wire the same in every second winding 241. The conductive wires of the second windings 241 in this example are wound around the teeth 27 having tooth numbers "4", "6", "10", "12", "16", "18", "22", "24", "28", and "30" at the same number of turns, which is equal to or higher than 1. In this example, the conductive wires of the second windings 241 that are wound around the teeth 27 having the teeth numbers "6", "12", "18", "24", and "30" are wound in the same winding direction as the winding direction of the conductive wires of the maximum width windings 231A, and the conductive wires of the second windings 241 that are wound around the teeth 27 having the teeth numbers "4", "10", "16", "22", and "28" are wound in a winding direction reverse to the winding direction of the conductive wires of the second windings 241 that are wound around the teeth 27 having the teeth numbers "6", "12", "18", "24", and "30". In other words, the second windings 241 that are wound around the teeth 27 having the teeth numbers "6", "12", "24", and "30" are forward direction windings and the second windings 241 that are wound around the teeth 27 having the teeth numbers "4", "10", "16", "24", and "28" are reverse direction windings in this example. No first windings 231 and no second windings 241 are wound around the teeth 27 having teeth numbers "2", "8", "14", "20", and "26" in order to distribute the detection windings in a sine wave pattern.

In the first detection winding group 23, the total number of turns of the maximum width windings 231A, which are forward direction windings, and the total number of turns of the non-maximum width windings 231B, which are reverse direction windings, are equal to each other. In the second detection winding group 24, too, the total number of turns of the forward direction windings among the second windings 241 and the total number of turns of the reverse direction windings among the second windings 241 are equal to each other.

The spatial distribution of the number of turns of the first windings 231 and the second windings 241, which are thus wound around the plurality of teeth 27 of the detecting stator core 21, is given as a function expressed by a sine wave that has a spatial order determined in relation to a number of poles (i.e., number of teeth) 2M (M is an integer equal to or larger than 1) of the excitation windings 22 wound around the teeth 27 of the detecting stator core 21 and the number N (N is an integer equal to or larger than 1) of the salient poles 31 of the detecting rotor 3 (i.e., a multiplication factor N of angle). When the number of turns of the first windings 231 and the second windings 241 on the teeth 27 are given as $w_{cos,i}$ and $w_{sin,i}$ (i is 1, 2 ... 2M), respectively, and the maximum number of turns of the first windings 231 and the second windings 241 per tooth 27 is given as $w_{max}$, the spatial distributions of the number of turns of the first windings 231 and the second windings 241 are expressed by expressions given below. In Expression (1) to Expression (6), the double sign is applied in the same order as stated.

[Math. 1]

$$w_{cos,i} = \frac{1}{2}\left[w_{max}\cos\left(\frac{2\pi i}{2M}|M \pm N|\right) + w_{max}\cos\left\{\frac{2\pi i}{2M}(M - |M \pm N|)\right\}\right], \quad (1)$$

$(i = 1, 2, \ldots, 2M,$ (double sign in same order))

$$= \begin{cases} w_{max}\cos\left(\frac{2\pi i}{2M}|M \pm N|\right), & (2) \\ (i = 1, 3, \ldots, 2M - 1, \text{ (double sign in same order))} \\ 0, (i = 2, 4, \ldots, 2M, \text{ (double sign in same order))} & (3) \end{cases}$$

[Math. 2]

$$w_{sin,i} = \frac{1}{2}\left[w_{max}\sin\left(\frac{2\pi i}{2M}|M \pm N|\right) + w_{max}\sin\left\{\frac{2\pi i}{2M}(M - |M \pm N|)\right\}\right], \quad (4)$$

$(i = 1, 2, \ldots, 2M,$ (double sign in same order))

$$= \begin{cases} 0, (i = 1, 3, \ldots, 2M - 1, \text{ (double sign in same order))} & (5) \\ w_{max}\sin\left(\frac{2\pi i}{2M}|M \pm N|\right), & \\ (i = 2, 4, \ldots, 2M, \text{ (double sign in same order))} & (6) \end{cases}$$

Based on Expression (1) to Expression (6), the number of turns of the first windings (COS phase detecting windings) 231 and the second windings (SIN phase detection windings) 241 are obtained by functions that are expressed by a sine wave of the ($|M\pm N|$)-th spatial order. From Expression (1) and Expression (4), the spatial distributions of the number of turns of the first windings 231 and the second windings 241 include functions expressed by a sine wave of the ($|M-|M\pm N||$)-th spatial order.

Figure 2:
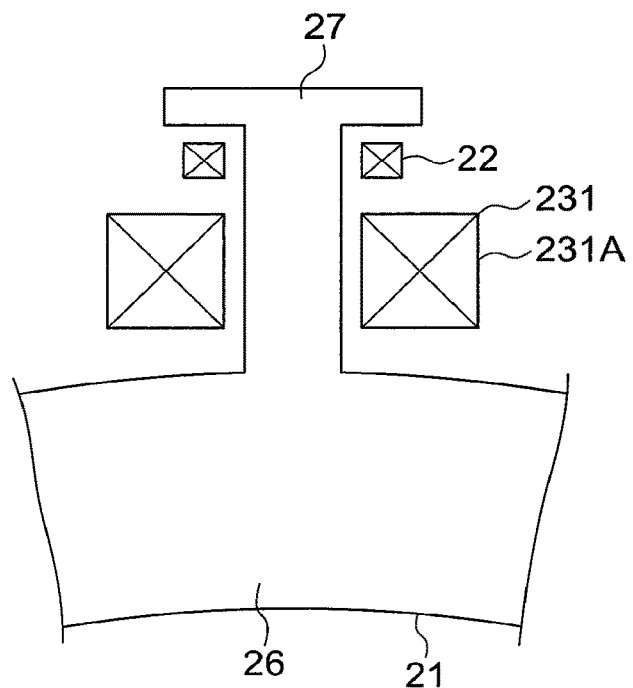
FIG. 2 is an enlarged view for illustrating an excitation winding and first winding wound around one of teeth of FIG. 1 that has a tooth number "5".
Figure 3:
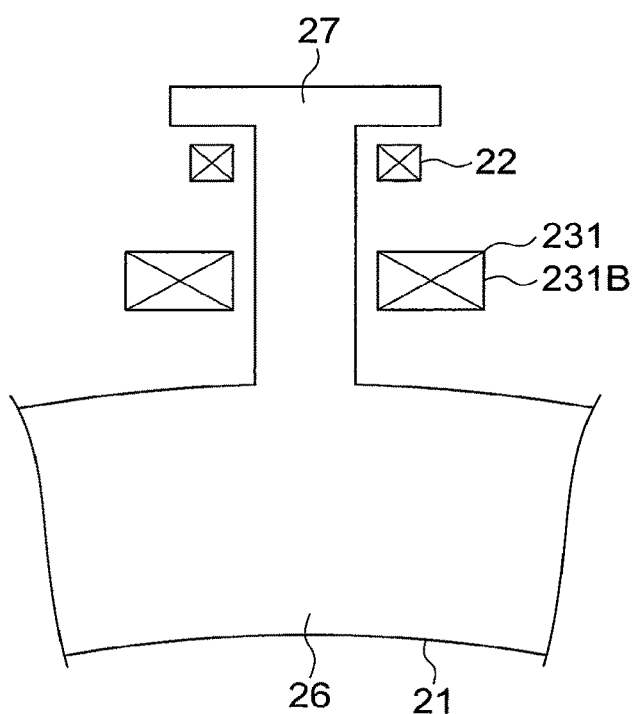
FIG. 3 is an enlarged view for illustrating an excitation winding and first winding wound around one of the teeth of FIG. 1 that has a tooth number "7".

FIG. 2 is an enlarged view for illustrating the excitation winding 22 and first winding 231 wound around one of the teeth 27 of FIG. 1 that has a tooth number "5". FIG. 3 is an enlarged view for illustrating the excitation winding 22 and first winding 231 wound around one of the teeth 27 of FIG. 1 that has a tooth number "7". The first winding 231 wound around the tooth 27 that has the tooth number "5" is one of the maximum width windings 231A, and the first winding 231 wound around the tooth 27 that has the tooth number "7" is one of the non-maximum width windings 231B.

Each of the first windings 231 is positioned so that the distance to the core back 26 is closer from the first winding 231 than from the excitation wiring 22. In other words, the maximum width winding 231A and the non-maximum width winding 231B are each positioned so that the distance to the core back 26 is closer from the maximum width winding 231A or the non-maximum width winding 231B than from the excitation winding 22. The first winding 231 and excitation winding 22 wound around the same tooth 27 are arranged so as to be separated from each other in the radial direction of the detecting stator 2. Each second winding 241 is also positioned so that the distance to the core back 26 is closer from the second winding 241 than from the relevant excitation winding 22. The second winding 241 and excitation winding 22 wound around the same tooth 27 are arranged so as to be separated from each other in the radial direction of the detecting stator 2.

In short, each detection winding (i.e., each first winding 231 and each second winding 241) is positioned so that the distance to the core back 26 is closer from the detection winding than from the relevant excitation winding 22. A detection winding (i.e., first winding 231 or second winding 241) and excitation winding 22 wound around the same tooth 27 are arranged so as to be separated from each other in the radial direction of the detecting stator 2.

Envelopes of detection voltages of the first windings 231 and the second windings 241 with respect to an exciting voltage of the resolver having the multiplication factor N of angle are ideally sine waves different from each other in phase by 90°. When the mechanical angle of the detecting rotor 3 is given as θ [rad], and the waveforms of voltages detected in the first windings 231 and the second windings 241 are given as $E_c(\theta)$ and $E_s(\theta)$, respectively, the rotation angle of the detecting rotor 3 obtained from the detection voltages of the first windings 231 and the second windings 241 and expressed in electrical angle is N×$\tan^{-1}$ ($E_s(\theta)/E_c(\theta)$). An angle detection error $\varepsilon(\theta)$ [rad] (electrical angle) of the resolver having the multiplication factor N of angle is accordingly expressed by Expression (7).

[Math. 3]

$$\varepsilon(\theta) = N\theta - \tan^{-1}\left(\frac{E_s(\theta)}{E_c(\theta)}\right) \quad (7)$$

The waveform $E_c(\theta)$ of the detection voltage of the first windings 231 and the waveform $E_s(\theta)$ of the detection voltage of the second windings 241 are ideally expressed by Expression (8). Expression (8) is normalized so that the amplitude is 1.

[Math. 4.]

$$\begin{cases} E_s(\theta) = \sin(N\theta) \\ E_c(\theta) = \cos(N\theta) \end{cases} \quad (8)$$

When $E_c(\theta)$ and $E_s(\theta)$ are the ideal waveforms expressed by Expression (8), the angle detection error $\varepsilon(\theta)$ is calculated as 0 by Expression (7). The actual waveforms $E_c(\theta)$ and $E_s(\theta)$ of the detection voltages, however, include noise caused by an amplitude difference, noise caused by a phase difference, and harmonics superimposed on the detection voltages, and may consequently differ from the ideal waveforms of a sine wave as indicated by Expression (9).

[Math. 5]

$$\begin{cases} E_s(\theta) = A_S \sin(N\theta + \phi_S) + \sum_{\substack{k=0 \\ k \neq N}}^{\infty} B_{Sk}\sin(k\theta + \psi_{Sk}) \\ E_c(\theta) = A_C \cos(N\theta + \phi_C) + \sum_{\substack{k=0 \\ k \neq N}}^{\infty} B_{Ck}\sin(k\theta + \psi_{ck}) \end{cases} \quad (9)$$

In Expression (9), $A_S$ and $A_C$ represent the N-th order amplitudes of the detection voltages of the second windings 241 (SIN phase detection windings) and the first detection windings 231 (COS phase detection windings), respectively, $\varphi_S$ and $\varphi_C$ represent the N-th order phases of the detection voltages of the second windings 241 and the first windings 231, respectively, $B_{Sk}$ and $B_{Ck}$ represent the amplitudes of the k-th (k≠N) order harmonics of the detection voltages of the second windings 241 and the first windings 231, respectively (the k-th order is an order other than the N-th order), and $\Psi_{Sk}$ and $\Psi_{Ck}$ represent the k-th (k≠N) order phases of the detection voltages of the second windings 241 and the first windings 231, respectively (the k-th order is an order other than the N-th order).

In particular, when offsets (namely, the 0-th order harmonics) are superimposed on the waveforms of the detection voltages of the first windings 231 and the second windings 241, and are given as Oc and Os, $E_c(\theta)$ and $E_s(\theta)$ are expressed by Expression (10).

[Math. 6]

$$\begin{cases} E_s(\theta) = \sin(N\theta) + O_s \\ E_c(\theta) = \cos(N\theta) + O_c \end{cases} \quad (10)$$

The angle detection error $\varepsilon(\theta)$ when the offset components satisfy $|Oc|\ll 1$ and $|Os|\ll 1$ can be calculated by Expression (11) with the use of Expression (7), Expression (10), and the commonly known trigonometric function formula.

[Math. 7]

$$\varepsilon(\theta) \approx O_s \cos(N\theta) - O_c \sin(N\theta) = \sqrt{O_c^2 + O_s^2} \sin(N\theta + \xi) \quad (11)$$

(where . . . )$\xi = \tan^{-1}(O_s/-O_c)$

The waveform Ec(θ) of voltage signals detected in the first detection winding group 23 is obtained as the sum of voltages induced in the first windings 231, and the waveform Es(θ) of voltage signals detected in the second detection winding group 24 is obtained as the sum of voltages induced in the second windings 241. The waveforms of the voltage signals are also obtained as envelopes having waveforms that are obtained as time derivatives of the interlinkage magnetic flux. Based on Expression (7) to Expression (11), the angle detection error ε(θ) can accordingly be reduced by preventing the offsets, which are harmonics superimposed on the interlinkage magnetic flux, in particular, the 0-th order harmonics, from increasing.

Figure 4:
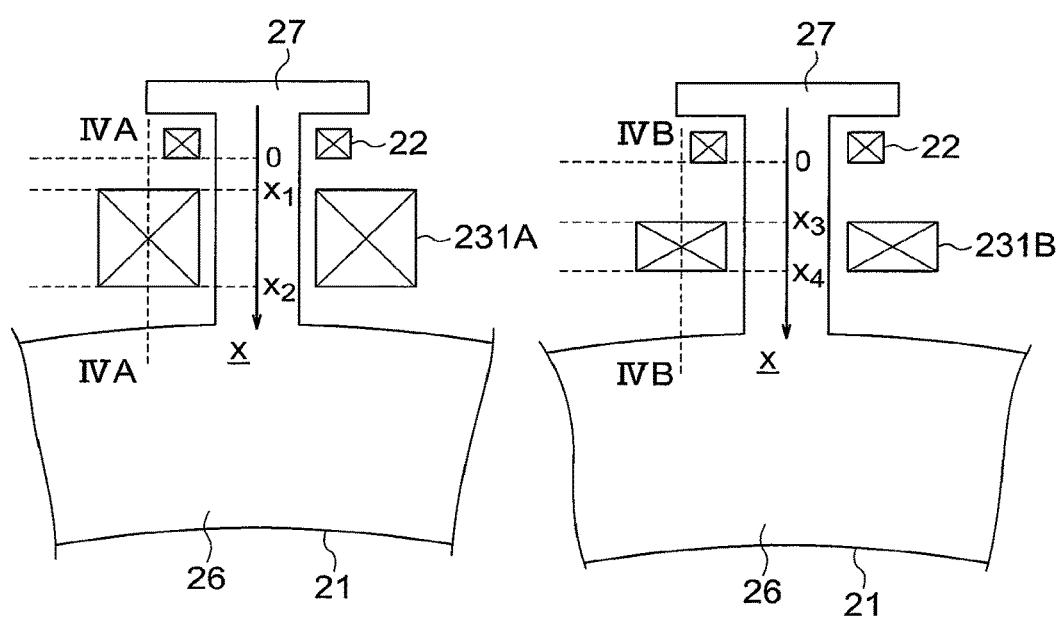
FIG. 4 is a schematic diagram for illustrating, side by side, the excitation winding and maximum width winding of FIG. 2, which are wound around the same tooth, and the excitation winding and non-maximum width winding of FIG. 3, which are wound around the same tooth.

FIG. 4 is a schematic diagram for illustrating, side by side, the excitation winding 22 and maximum width winding 231A of FIG. 2, which are wound around the same tooth 27, and the excitation winding 22 and non-maximum width winding 231B of FIG. 3, which are wound around the same tooth 27. In FIG. 4, the teeth 27 are arranged parallel to each other and the positions of end portions of the excitation windings 22 on the core back 26 side are matched in a direction orthogonal to the teeth 27 in order to illustrate the positional relation between the maximum width winding 231A and the non-maximum width winding 231B in the radial direction. In FIG. 4, the end portion of each excitation winding 22 on the core back 26 side is illustrated as an original 0 to draw on each tooth 27 an x coordinate axis with a positive direction running toward the core back 26. The x coordinate axis is a coordinate axis running along the radial direction of the detecting stator 2.

The maximum width winding 231A is arranged so as to cover an area between a coordinate x1 and a coordinate x2. The non-maximum width winding 231B is arranged so as to cover an area between a coordinate x3 and a coordinate x4. In FIG. 4, x2>x4>x3>x1 is satisfied.

Figure 5:
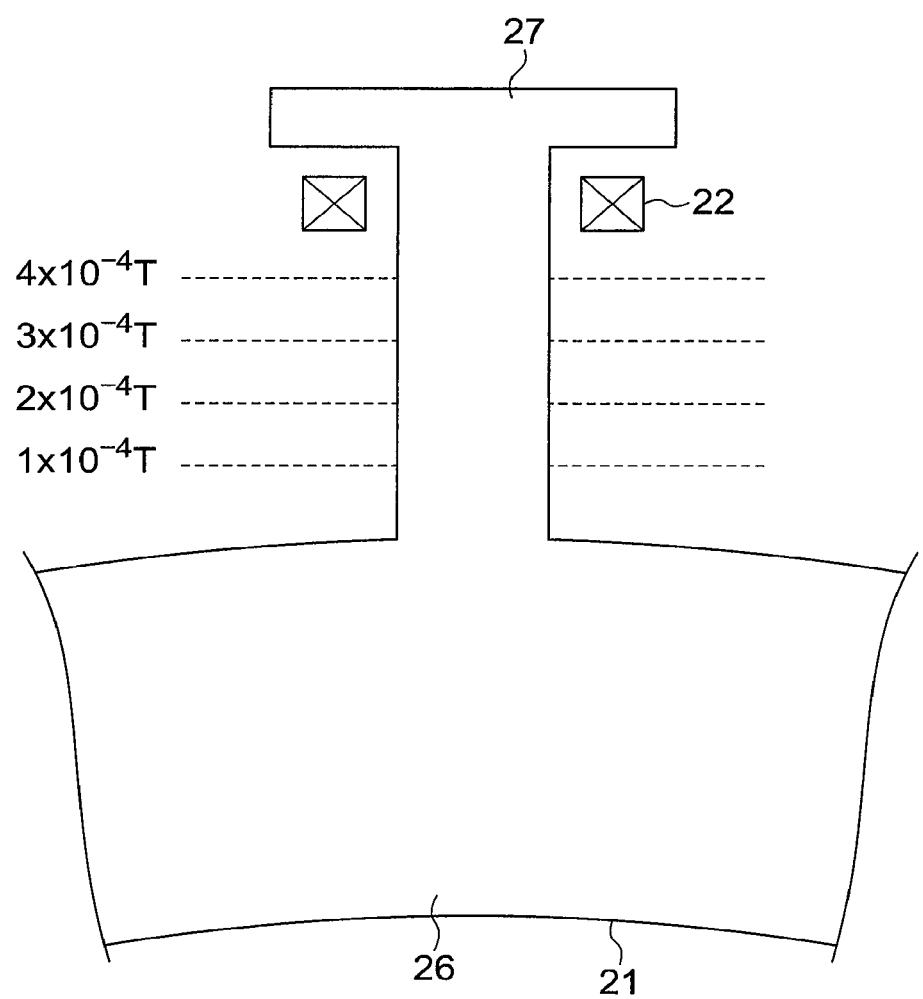
FIG. 5 is a schematic diagram for illustrating a magnetic flux density distribution of a magnetic flux formed around each of the teeth of FIG. 1.

FIG. 5 is a schematic diagram for illustrating a magnetic flux density distribution of a magnetic flux formed around each of the teeth 27 of FIG. 1. However, values of the magnetic flux density distribution illustrated in FIG. 5 are merely an example, and the magnetic flux density distribution does not always take the illustrated values. The excitation winding 22 supplied with an alternating current power forms a magnetic flux having the magnetic flux density distribution of FIG. 5 around the tooth 27. A magnetic flux formed around each tooth 27 wound with one of the excitation windings 22 has a gradient in the radial direction of the detecting stator 2 and is distributed substantially evenly in the circumferential direction of the detecting stator 2 as illustrated in FIG. 5. In other words, the magnetic flux density around each tooth 27 has a gradient in a direction running along the x coordinate axis, and is substantially equal at positions where the x coordinates have the same value.

On the tooth 27 wound with one of the first windings 231 or one of the second windings 241, the first winding 231 or the second winding 241 and the relevant excitation winding 22 are arranged so as to be separated from each other in the radial direction of the detecting stator 2. This means that the magnetic flux density of a magnetic flux interlinking one of the first windings 231 and one of the second windings 241 has a gradient in the radial direction of the detecting stator 2 and is distributed substantially evenly in the circumferential direction of the detecting stator 2.

Figure 6:
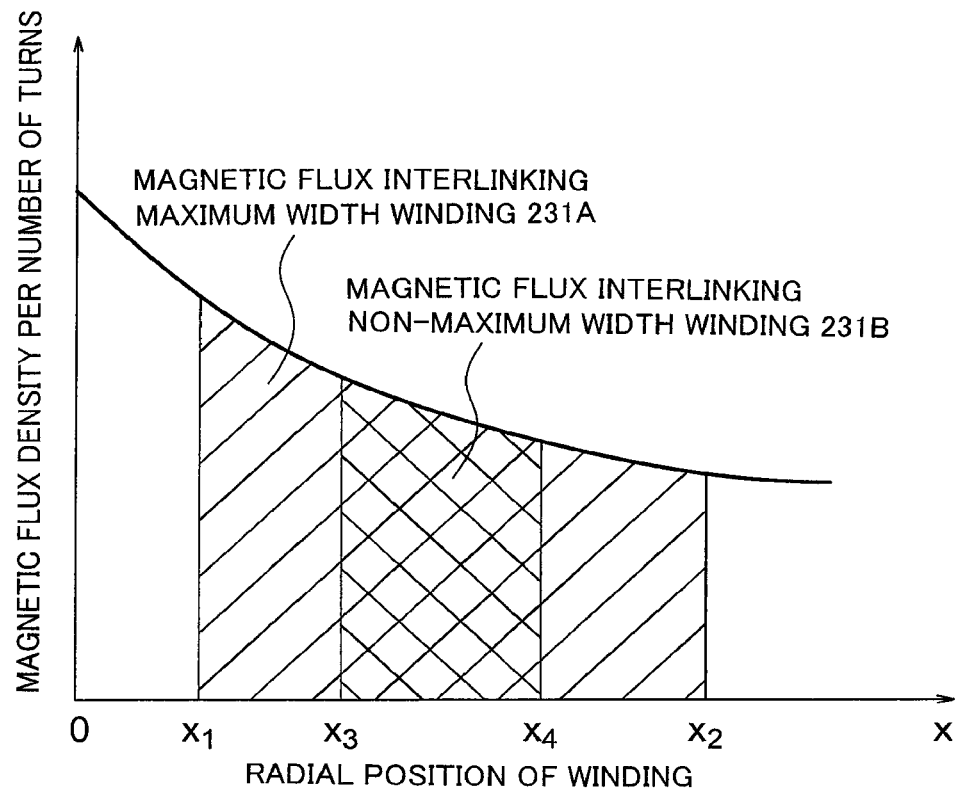
FIG. 6 is a graph for showing a relation between the radial positions of the maximum width winding and non-maximum width winding of FIG. 4 and the interlinkage magnetic flux densities per number of turns of the maximum width winding and the non-maximum width winding.

FIG. 6 is a graph for showing a relation between the radial positions of the maximum width winding 231A and non-maximum width winding 231B of FIG. 4 and the interlinkage magnetic flux densities per number of turns of the maximum width winding 231A and the non-maximum width winding 231B. The magnetic flux densities shown in FIG. 6 are the interlinkage magnetic flux density of the maximum width winding 231A along the IVA-IVA line of FIG. 4 and the interlinkage magnetic flux density of the non-maximum width winding 231B along the IVB-IVB line of FIG. 4. It is understood from FIG. 6 that the volume of an interlinkage magnetic flux of a detection winding varies depending on the radial position of the detection winding and the radial winding width of the detection winding. The volume of the interlinkage magnetic flux of the maximum width winding 231A and the volume of the interlinkage magnetic flux of the non-maximum width winding 231B consequently differ from each other. It is also understood from FIG. 6 that a change of the position of the non-maximum width winding 231B relative to the position of the maximum width winding 231A in the radial direction of the detecting stator 2 changes a relation between the interlinkage magnetic flux volumes of the maximum width winding 231A and the non-maximum width winding 231B as well.

With the conductive wires of the maximum width windings 231A and the conductive wires of the non-maximum width windings 231B wound in different directions from each other, when the COS phase detection voltage is to be obtained by adding up output voltages from the first windings 231, harmonics that are noise are therefore canceled by adjusting the positions of the non-maximum width winding 231B relative to the positions of the maximum width windings 231A in the radial direction of the detecting stator 2, and an angle detection error due to the harmonic component is prevented as a result. In addition, the offsets, which are a type of harmonics superimposed on voltages that are induced by magnetic fluxes interlinking the detection windings 231 and 241, can be reduced particularly significantly by adjusting the positions of the non-maximum width windings 231B relative to the positions of the maximum width windings 231A.

Figure 7:
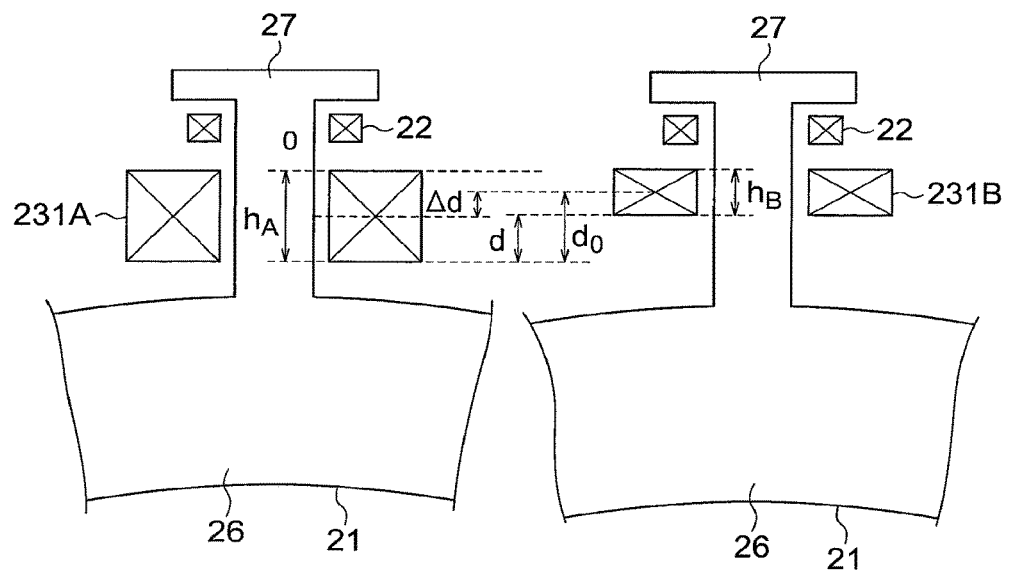
FIG. 7 is a schematic diagram for illustrating a relation between the radial winding width and radial position of the maximum width winding of FIG. 4 and the radial winding width and radial position of the non-maximum width winding of FIG. 4.

FIG. 7 is a schematic diagram for illustrating a relation between the radial winding width and radial position of the maximum width winding 231A of FIG. 4 and the radial winding width and radial position of the non-maximum width winding 231B of FIG. 4. In FIG. 7, the radial winding width of the maximum width winding 231A is given as $h_A$ and the radial winding width of the non-maximum width winding 231B is given as $h_B$. The position of the end portion of the maximum width winding 231A on the core back 26 side is used as a reference point in the radial direction of the detecting stator 2 in FIG. 7. The distance from the reference point to the center position of the non-maximum width winding 231B is illustrated as d0, and the distance from the reference point to the end portion of the non-maximum width winding 231B on the core back 26 side is illustrated as d. FIG. 7 further includes Δd, which is the distance between the center position of the maximum width winding 231A and the center position of the non-maximum width winding 231B in the radial direction of the detecting stator 2, namely, the amount of misalignment between the maximum width winding 231A and the non-maximum width winding 231B. A relationship of $0<h_B<h_A$ is established in FIG. 7.

The magnetic flux density of a magnetic flux formed around each tooth 27 is known to vary greatly in the radial direction of the detecting stator 2 at a position close to the excitation winding 22. At a position apart from the excitation winding 22, on the other hand, the magnetic flux density around the tooth 27 changes substantially in proportion to the position in the radial direction of the detecting stator 2 as illustrated in FIG. 5. With the conductive wire of the maximum width winding 231A and the conductive wire of the non-maximum width winding 231B wound in different directions from each other, an effect in that noise has less chance of being superimposed on the maximum width winding 231A and the non-maximum width winding 231B is therefore obtained by adjusting the position of the non-maximum width winding 231B so that both of end portions of the non-maximum width winding 231B in the radial direction are contained within the radial winding width $h_A$ of the maximum width winding 231A.

In the first embodiment, the radial winding width $h_B$ of the non-maximum width winding 231B is contained within the radial winding width $h_A$ of the maximum width winding 231A by taking care that the radial end portions of the non-maximum width winding 231B do not fall outside the radial winding width $h_A$ of the maximum width winding 231A when the first detection winding group 23 is viewed along the circumferential direction of the detecting stator 2. In other words, the relation between the maximum width winding 231A and the non-maximum width winding 231B in the radial direction of the detecting stator 2 satisfies $0<h_B<h_A$ and $0 \leq d \leq (h_A-h_B)$.

Figure 8:
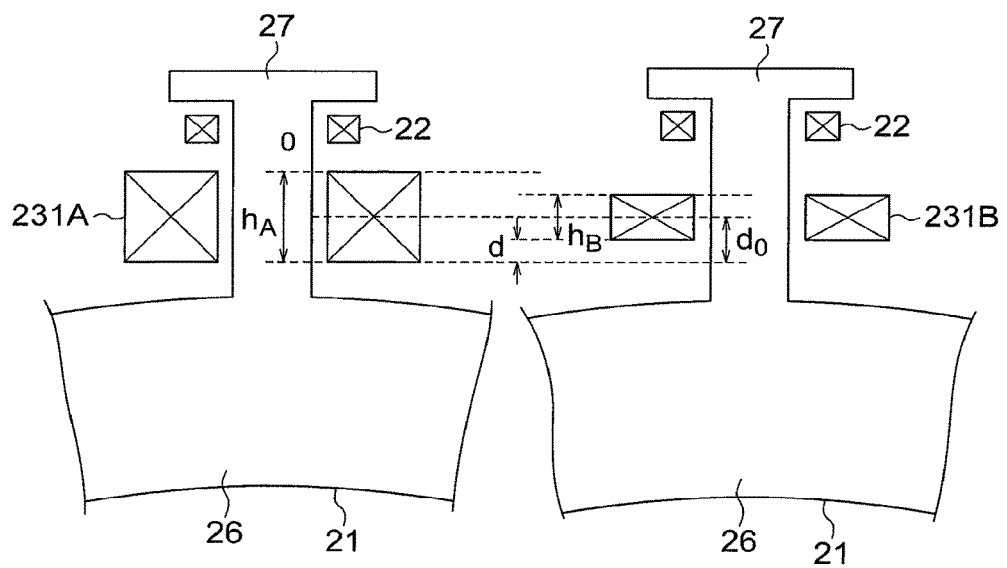
FIG. 8 is a schematic diagram for illustrating a state under which the center position of the non-maximum width winding of FIG. 7 matches with the center position of the maximum width winding of FIG. 7 in the radial direction of a detecting stator.

FIG. 8 is a schematic diagram for illustrating a state under which the center position of the non-maximum width winding 231B of FIG. 7 matches with the center position of the maximum width winding 231A of FIG. 7 in the radial direction of the detecting stator 2. In the first embodiment, the center position of the non-maximum width winding 231B matches with the center position of the maximum width winding 231A in the radial direction of the detecting stator 2 when the first detection winding group 23 is viewed along the circumferential direction of the detecting stator 2. In other words, the misalignment amount Δd of misalignment between the maximum width winding 231A and the non-maximum width winding 231B is 0 in the first embodiment.

Figure 9:
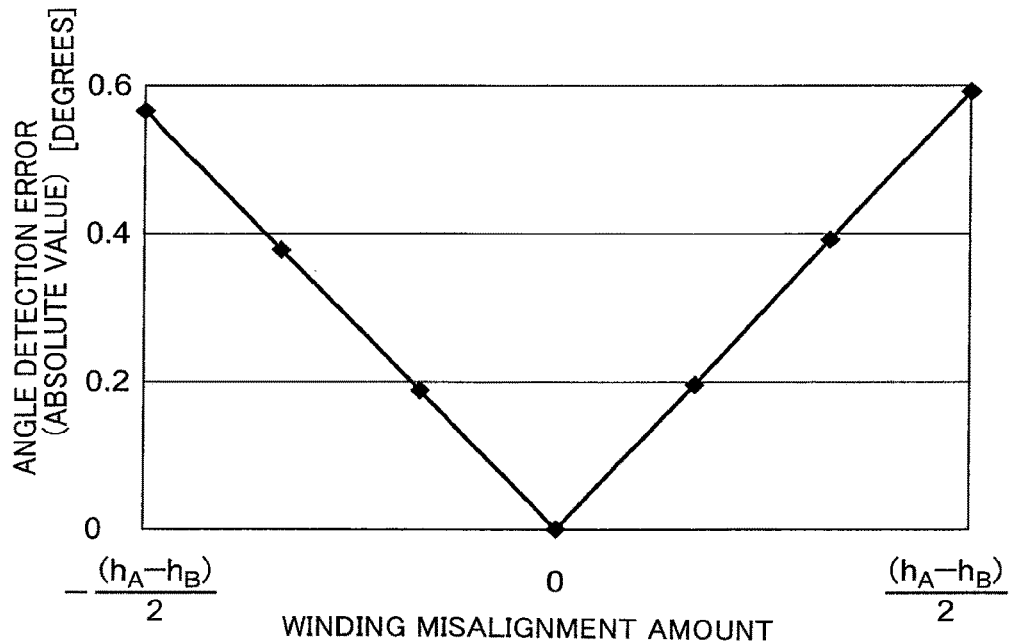
FIG. 9 is a graph for showing the relation of the amount of misalignment between the center positions of the maximum width winding and non-maximum width winding of FIG. 7 to an angle detection error of the resolver.

FIG. 9 is a graph for showing the relation of the misalignment amount Δd of misalignment between the center positions of the maximum width winding 231A and non-maximum width winding 231B of FIG. 7 to an angle detection error of the resolver 1. It is understood from FIG. 9 that the angle detection error of the resolver 1 becomes greater as the misalignment amount Δd of misalignment between the center position of the maximum width winding 231A and the center position of the non-maximum width winding 231B becomes larger, and is at minimum when Δd=0 is established, that is, when $d=(h_A-h_B)/2$ is satisfied. It is therefore understood that the angle detection error of the resolver 1 is prevented from increasing by matching the center position of the maximum width winding 231A and the center position of the non-maximum width winding 231B with each other in the radial direction of the detecting stator 2 when the first detection winding group 23 is viewed along the circumferential direction of the detecting stator 2.

Figure 10:
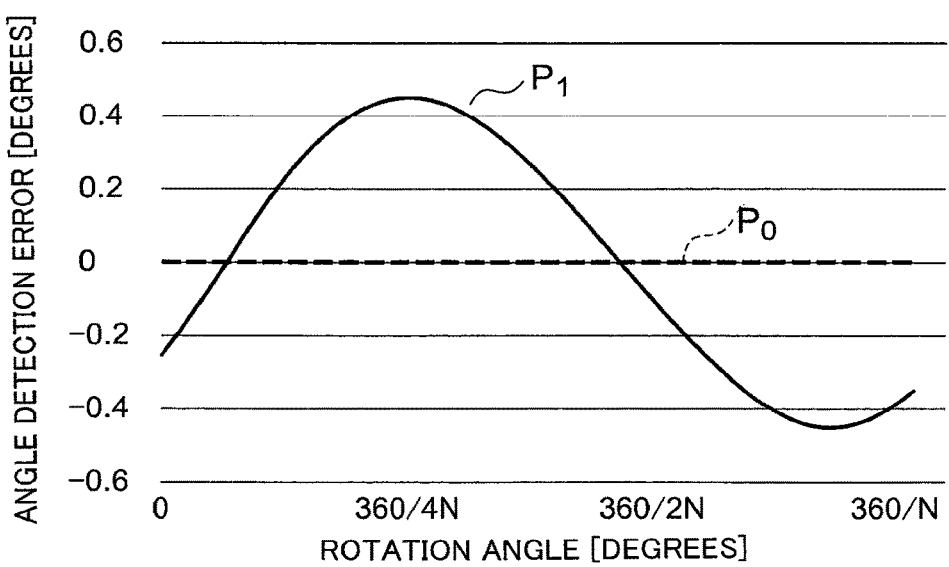
FIG. 10 is a graph for comparing relations between the angle detection error and the rotation angle that are observed when the amount of misalignment between the maximum width winding and non-maximum width winding of FIG. 7 has a particular value, which is not 0, and when the amount of the misalignment between the maximum width winding and non-maximum width winding of FIG. 7 is 0.

FIG. 10 is a graph for comparing relations between the angle detection error and the rotation angle that are observed when the misalignment amount Δd of misalignment between the maximum width winding 231A and non-maximum width winding 231B of FIG. 7 has a particular value, which is not 0 (Δd≠0), and when the misalignment amount Δd of the misalignment between the maximum width winding 231A and non-maximum width winding 231B of FIG. 7 is 0 (Δd=0). In FIG. 10, P1 represents the angle detection error observed when the misalignment amount Δd is the particular value, which is not 0, and P0 represents the angle detection error observed when the misalignment amount Δd is 0. It is understood from FIG. 10 that the angle detection error P1 is large at some rotation angle of the detecting rotor 3 when the misalignment amount Δd is the particular value, which is not 0, while the angle detection error P0 is reduced when the misalignment amount Δd is 0, no matter what value the rotation angle of the detecting rotor 3 takes. FIG. 10 is accordingly another proof that the angle detection error of the resolver 1 is prevented from increasing by matching the center position of the maximum width winding 231A and the center position of the non-maximum width winding 231B with each other in the radial direction of the detecting stator 2. This relation is established when a function as a resolver is fulfilled regardless of what combination of the number of salient poles and the excitation order is used.

As described above, the envelope waveforms of the detection voltages of the first windings 231 and the second windings 241 are desirably in sine wave patterns electrically different from each other by 90° as in Expression (8) in order to reduce the angle detection error of the resolver 1. The COS phase detection voltage and the SIN phase detection voltage are induced by changes with time of magnetic fluxes interlinking the detection windings. The angle detection error of the resolver 1 therefore tends to increase when the conductive wires of the detection windings are misaligned or when the positions of the two types of detection windings are shifted far from each other in the radial direction of the detecting stator 2, which causes an amplitude difference and a phase difference between the detection voltages of the detection windings or superimposition of offsets on the detection voltages as indicated by Expression (9).

In the thus configured resolver 1, the first windings 231 and the second windings 241 are wound around different teeth 27 from each other without being wound around the same tooth 27, and one of the excitation windings 22 and the first winding 231 or the second winding 241 that are wound around the same tooth 27 are arranged so that the excitation winding 22 and the first winding 231 or the second wiring 241 are separated from each other in the radial direction of the detecting stator 2. An overlap between the outer rim of one of the excitation winding 22, the first winding 231, and the second winding 241 and another of the three types of windings is consequently prevented when the windings are wound. In addition, the thicknesses of the windings 22, 231, and 241 can be prevented from increasing in the circumferential direction of the detecting stator 2 by avoiding winding all three types of windings, that is, the excitation windings 22, the first windings 231, and the second windings 241, around the same tooth 27. This can ensure the prevention of the accidental unwinding and winding disorder of the excitation windings 22, the first windings 231, and the second windings 241 even more, and the conductive wires of the windings 22, 231, and 241 can be prevented from being wound in a misaligned manner. The angle detection error of the resolver 1 can accordingly be prevented from increasing.

The first windings 231 and the second windings 241 are arranged so as to be separated from the excitation windings 22 in the radial direction of the detecting stator 2. Compared to the related art in which the two types of windings are wound in an overlapping manner, this arrangement is advantageous in that the positions of the first windings 231 and the positions of the second windings 241 relative to the excitation windings 22 can be adjusted independently of one another in the radial direction of the detecting stator 2. The magnitudes of voltages induced in the first windings 231 and the second windings 241 are accordingly adjustable, which helps to prevent the angle detection error of the resolver 1 from increasing.

The excitation windings 22 each have the same radial winding width, and the positions of the excitation windings 22 match one another in the radial direction of the detecting stator 2 when viewed along the circumferential direction of the detecting stator 2, which can provide every tooth 27 with the same magnetic flux density distribution in the radial direction of the detecting stator 2. This can reduce the offsets, the amplitude difference, and the phase difference, which are caused in the detection voltages by misalignment of the excitation windings 22, and the angle detection error of the resolver 1 can further be prevented from increasing.

The radial winding width $h_B$ of each non-maximum width winding 231B is contained within the radial winding width hp, of each maximum width winding 231A when viewed along the circumferential direction of the detecting stator 2. A range in which a magnetic flux common to the non-maximum width winding 231B and the maximum width winding 231A interlinks can accordingly be set large. This further helps to prevent the angle detection error of the resolver 1, which is caused by the superimposition of harmonics on the detection voltages of the two types of first windings 231 and by the amplitude difference and the phase difference between the detection voltages, from increasing.

The center position of the non-maximum width winding 231B and the center position of the maximum width winding 231A also match each other in the radial direction of the detecting stator 2 when viewed along the circumferential direction of the detecting stator 2. Therefore, the angle detection error of the resolver 1, which is caused by the superimposition of harmonics on the detection voltages of the two types of first windings 231 and by the amplitude difference and the phase difference between the detection voltages, can further be prevented from increasing.

In the first detection winding group 23, the total number of turns of the maximum width windings 231A, which are forward direction windings, and the total number of turns of the non-maximum width windings 231B, which are reverse direction windings, are equal to each other. A positive voltage and a negative voltage can therefore be canceled out in the first detection winding group 23, which can reduce the offsets of detection voltages of the first detection winding group 23. This can further prevent the angle detection error of the resolver 1 from increasing. Also in the second detection winding group 24, the total number of turns of the forward direction windings among the second windings 241 and the total number of turns of the reverse direction windings among the second windings 241 are equal to each other. The offsets of detection voltages of the second detection winding group 24 can accordingly be reduced as in the first detection winding group 23, and the angle detection error of the resolver 1 can further be prevented from increasing.

The radial winding width $h_B$ of each non-maximum width winding 231B is narrower than the radial winding width $h_A$ of each maximum width winding 231A, which allows the position of the non-maximum width winding 231B in the radial direction of the detecting stator 2 to be adjusted in a larger range than a position adjustable range for the maximum width winding 231A. The angle detection error of the resolver 1 can accordingly be prevented from increasing by adjusting the position of each non-maximum width winding 231B in the radial direction even when there is little room for position adjustment for the maximum width winding 231A in the radial direction. This can improve the degree of freedom in the designing of the resolver 1.

In the detecting stator 2, on the other hand, the number of non-maximum width windings 231B is larger than the number of maximum width windings 231A. The number of windings that are adjusted in position can accordingly be reduced by adjusting the positions of the maximum width windings 231A, which are fewer than the non-maximum width winding 231B, in the radial direction when there is enough room for position adjustment for the maximum width windings 231A in the radial direction. This can lighten the burden of position adjustment work in which the positions of the detection windings 231 and 241 are adjusted.

Figure 11:
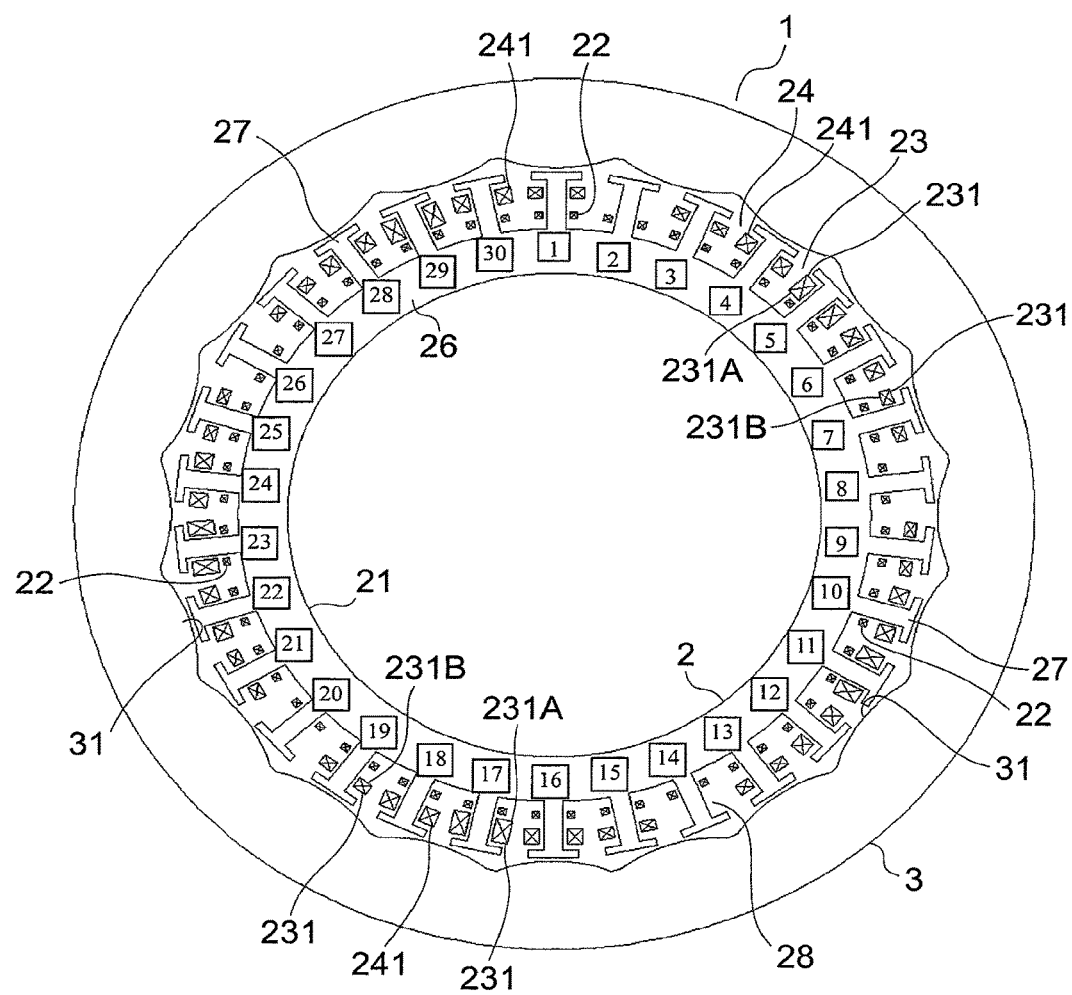
FIG. 11 is a front view for illustrating another example of the resolver according to the first embodiment of the present invention.

The first windings 231 and the second windings 241 in the example described above are each positioned so that the distance to the core back 26 is closer from the first winding 231 or the second winding 241 than from the relevant excitation winding 22. Alternatively, the first windings 231, the second windings 241, and the excitation windings 22 may each be positioned as illustrated in FIG. 11, in which the distance to the core back 26 is closer from the excitation winding 22 than from the first winding 231 or from the second winding 241. In other words, the first windings 231 and the second windings 241 may be positioned so that the distance to the detecting rotor 3 is closer from the first windings 231 and from the second windings 241 than from the excitation windings 22. The excitation windings 22 in this case each have the same radial winding width and also match one another in the radial direction. In this manner, too, the angle detection error of the resolver 1 can be prevented from increasing while preventing an increase in the size of the resolver 1.

The number of teeth 27 of the detecting stator 2 is thirty and the number of salient poles 31 of the detecting rotor 3 is twenty in the example described above. However, the combination of the number of teeth 27 and the number of salient poles 31 is not limited thereto, as long as the combination allows the resolver to fulfill its function. The present invention is therefore applicable also to Example 1-1 to Example 1-5 of FIG. 12, in which the combination of the number of teeth 27 and the number of salient poles 31 (i.e., multiplication factor of angle) differs from the combination of thirty teeth 27 and twenty salient poles 31 of the example described above, and the angle detection error of the resolver can be prevented from increasing in Examples as well.

FIG. 12 is a table for showing combinations of the number of teeth 27, the number of salient poles 31 (i.e., multiplication factor of angle), and the order of the excitation windings 22 in Example 1-1 to Example 1-5 of the present invention. As shown in FIG. 12, the number of turns distributions of the first windings 231 and the second windings 241 are given a discrete sine pattern by applying the multiplication factor N of angle and the order M of the excitation windings 22 to Expression (1) to Expression (6), and the order of the angle detection error of the resolver is determined by Expression (7) to Expression (11) in any of Example 1-1 to Example 1-5.

Example 1-1, namely, the same argument as the one illustrated in FIG. 1 to FIG. 10, is established when the number of turns of windings that are constituents of the first detection winding group or the second detection winding group have a number of turns distribution in a sine wave pattern, the number of turns or winding widths of the constituent windings have a magnitude relation, and the positions of the windings that are constituents of the detection winding group are adjustable. The spatial distributions of the number of turns of the first detection winding group and the second detection winding group are expressed by a sine wave of the (|M±N|)-th or (|M−|M±N||)-th spatial order. A fifth spatial order number of turns distribution can therefore be given in Example 1-1 (the fifth order is equivalent to 35th order ($|2M-|M\pm N||=|30-35|=5$), which is obtained by shifting the COS value by a phase of $2\pi$ in Expression (1) to Expression (6)). The fifth order spatial distribution means, in the case of a resolver having thirty teeth, that the same winding pattern appears every six teeth, and that three teeth and remaining three teeth in a single winding pattern are allocated to windings of the first detection winding group and windings of the second detection winding group, respectively, which have phases electrically different from each other by 90°. The first detection winding group can accordingly have both the maximum width windings 231A and the non-maximum width windings 231B when the number of turns has a spatial fifth order distribution, and the argument given above is established.

In any of Examples shown in FIG. 12, the number of turns distribution can be a spatial fifth order distribution or a spatial third order distribution, and windings of the first detection winding group and the second detection winding group can be configured so as to have a magnitude relation. A winding position adjustment for reducing the angle detection error can therefore be conducted in Examples based on the argument described above.

As described above, the alignment of the conductive wires of the windings 22, 231, and 241 can be improved by arranging the excitation winding 22 and the first winding 231 or the second winding 241, which are wound around the same tooth 27, so that the windings 22 and 231, or 22 and 241, are separated from each other, and the angle detection error of the resolver can also be reduced by adjusting the positions of the first windings 231 and the second windings 241. It should be understood that the present invention is applicable also to combinations of the number of teeth 27 and the number of salient poles 31 that are not shown in FIG. 12, when the number of salient poles and the excitation order are combined so that the number of turns has such a spatial distribution as the one described above.

Second Embodiment

Figure 13:
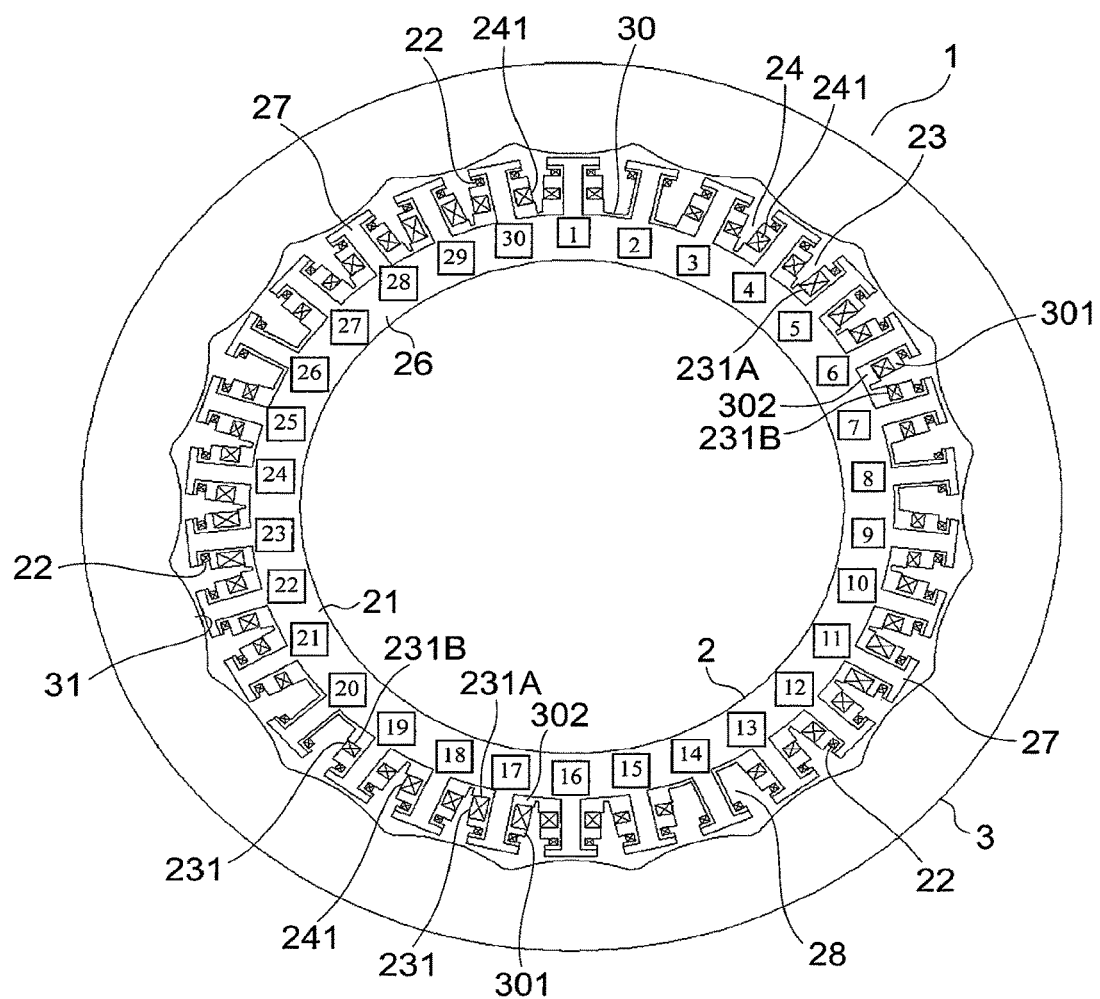
FIG. 13 is a front view for illustrating a resolver according to a second embodiment of the present invention.

FIG. 13 is a front view for illustrating a resolver according to a second embodiment of the present invention. The resolver 1 in the second embodiment has the same configuration as the one in the first embodiment, except for the configuration of an insulator 30. The insulator 30, which is a non-magnetic body, is interposed between the detecting stator core 21 and the excitation windings 22, between the detecting stator core 21 and the first detection winding group 23, and between the detecting stator core 21 and the second detection winding group 24. The insulator 30 includes a plurality of partition portions 301, each of which is interposed between the excitation winding 22 and the detection winding 231 or 241 that are wound around the same tooth 27, and a plurality of protruding portions 302, each of which is interposed between one of the detection windings 231 or one of the detection windings 241 and the core back 26. The excitation windings 22 and the detection windings 231 and 241 are arranged so as to be separated from each other via the partition portions 301 in the radial direction of the detecting stator 2. The detection windings 231 and 241 and the core back 26 are arranged so as to be separated from each other via the protruding portions 302 in the radial direction of the detecting stator 2.

Figure 14:
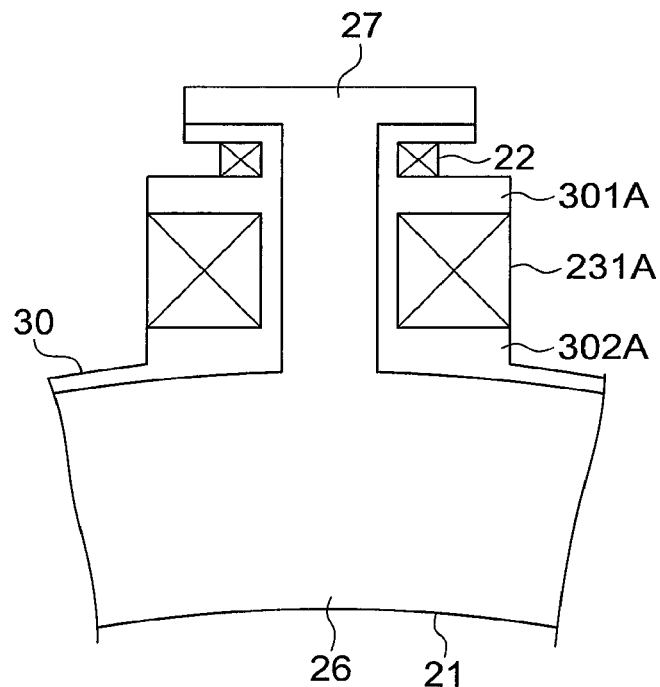
FIG. 14 is an enlarged view for illustrating an excitation winding and maximum width winding wound around one of teeth of FIG. 13 that has a tooth number "5".
Figure 15:
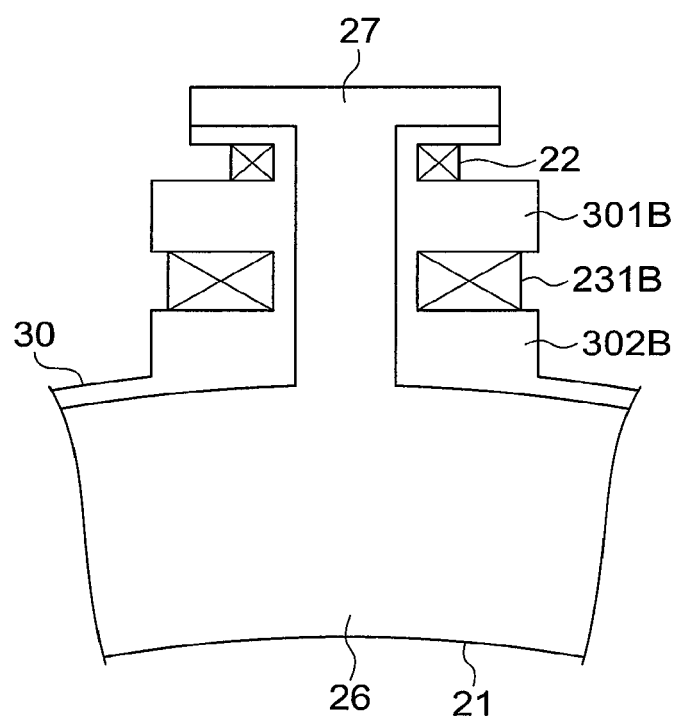
FIG. 15 is an enlarged view for illustrating an excitation winding and non-maximum width winding wound around one of the teeth of FIG. 13 that has a tooth number "7".

FIG. 14 is an enlarged view for illustrating the excitation winding 22 and maximum width winding 231A wound around one of the teeth 27 of FIG. 13 that has a tooth number "5". FIG. 15 is an enlarged view for illustrating the excitation winding 22 and non-maximum width winding 231B wound around one of the teeth 27 of FIG. 13 that has a tooth number "7". The maximum width winding 231A is positioned relative to the excitation winding 22 in the radial direction of the detecting stator 2 by adjusting the thickness of a partition portion 301A and the thickness of a protruding portion 302A as illustrated in FIG. 14. The non-maximum width winding 231B is positioned relative to the excitation winding 22 in the radial direction of the detecting stator 2 by adjusting the thickness of a partition portion 301B and the thickness of a protruding portion 302B as illustrated in FIG. 15.

In this example, with the radial winding width of the maximum width winding 231A wider than the radial winding width of the non-maximum width winding 231B, the partition portion 301B is thicker than the partition portion 301A and the protruding portion 302B is thicker than the protruding portion 302A. The rest of the configuration is the same as in the first embodiment.

In the thus configured resolver 1, the insulator 30, which is a non-magnetic body, includes the partition portions 301 each of which is interposed between the excitation winding 22 and the detection winding 231 or 241 that are wound around the same tooth 27, thereby ensuring that the state of electrical insulation between the excitation winding 22 and the detection winding 231 or 241 is maintained even more, and keeping the conductive wires of the excitation windings 22 and the detection windings 231 and 241 aligned better. In addition, the detection windings 231 and 241 can be positioned more accurately relative to the excitation windings 22 in the radial direction of the detecting stator 2 by adjusting the thicknesses of the partition portions 301. Harmonics of magnetic fluxes can be reduced in this manner, which further helps to prevent the angle detection error of the resolver 1 from increasing.

The insulator 30 further includes the protruding portions 302, each of which is interposed between one of the first windings 231 and the core back 26 or between one of the second windings 241 and the core back 26. The first winding 231 and the second winding 241 can therefore be positioned even more accurately relative to the excitation winding 22 in the radial direction of the detecting stator 2, which further helps to prevent the angle detection error of the resolver 1 from increasing.

Third Embodiment

Figure 16:
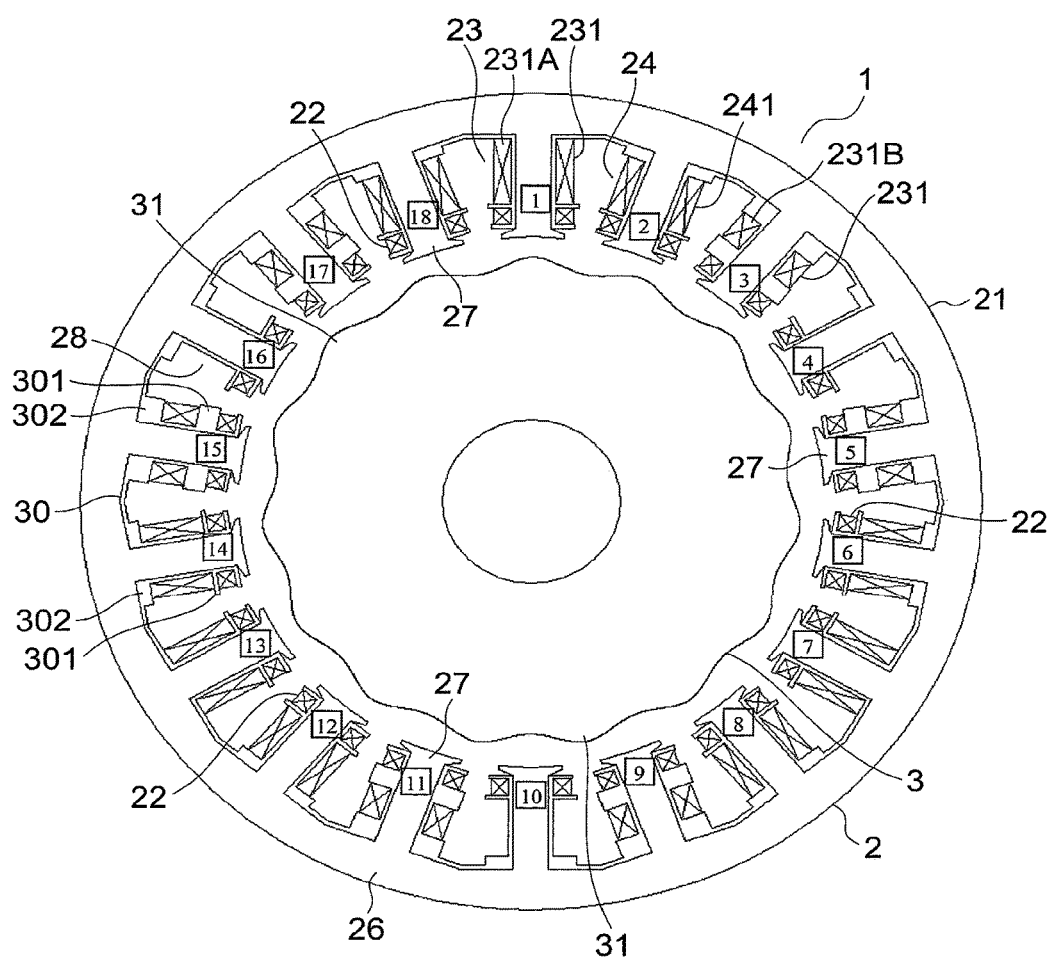
FIG. 16 is a front view for illustrating a resolver according to a third embodiment of the present invention.

FIG. 16 is a front view for illustrating the resolver 1 according to a third embodiment of the present invention. The resolver 1 used in this embodiment is an inner rotor-type resolver in which the detecting rotor 3, which is a magnetic body, is disposed on the inside in a radial direction of the ring-shaped detecting stator 2.

The detecting stator 2 includes the detecting stator core 21, which is a magnetic body, the plurality of excitation windings 22, the first detection winding group 23, and the second detection winding group 24, which are provided on the detecting stator core 21, and an insulator 30, which is a non-magnetic body interposed between each of the excitation windings 22, the first detection winding group 23, and the second detection winding group 24 and the detecting stator core 21. The state of insulation between each of the excitation windings 22, the first detection winding group 23, and the second detection winding group 24 and the detecting stator core 21 is ensured by the insulator.

The detecting stator core 21 includes the core back 26, which has a ring shape, and the plurality of teeth 27, which are arranged side by side in the circumferential direction of the detecting stator core 21, and which protrude from the core back 26 inward in a radial direction of the core back 26 toward the detecting rotor 3. In this example, eighteen teeth 27 are equally spaced in the circumferential direction of the detecting stator core 21. The slot 28, which is a groove open to the detecting rotor 3, is formed between one tooth 27 and another tooth 27. In FIG. 16, numbers (numbers each framed by a square frame) continuous in the circumferential direction are assigned to the respective teeth 27 as tooth numbers for convenience.

Each of the plurality of excitation windings 22 is wound around one of the plurality of teeth 27. The excitation windings 22 are electrically connected to one another in series.

The first detection winding group 23 has a plurality of first windings 231 as detection windings. The first windings 231 are electrically connected to one another in series. This makes the first windings 231 detection windings all having the same phase. The second detection winding group 24 has a plurality of second windings 241 as detection windings. The second windings 241 are electrically connected to one another in series. This makes the second windings 241 detection windings all having the same phase.

The first windings 231 and the second windings 241 are detection windings different from each other in the electrical angle phase of the detection voltage. In this example, the first windings 231 serve as COS phase detection windings and the second windings 241 serve as SIN phase detection windings. In other words, the first windings 231 and the second windings 241 are windings configured to detect phases electrically different from each other by 90°.

Each of the plurality of first windings 231 and each of the plurality of second windings 241 are wound around different teeth 27 from each other, without being wound around the same tooth 227. The first windings 231 and the second windings 241 are provided on the detecting stator core 21 so as to avoid providing detection windings of the same phase in two teeth 27 adjacent to each other in the circumferential direction of the detecting stator core 21. In this example, the first windings 231 are wound around teeth 27, which are selected every other tooth 27 in the circumferential direction out of the plurality of teeth 27, and the second winding 241 is wound around at least one of the plurality of remaining teeth 27, which are not the teeth 27 wound with the first windings 231.

The detecting rotor 3 includes a plurality of salient poles 31 arranged side by side in the circumferential direction of the detecting rotor 3. In this example, fifteen salient poles 31 are equally spaced in the circumferential direction of the detecting rotor 3. The detecting rotor 3 is arranged so as to be coaxial with the detecting stator 2, with the salient poles 31 facing the inner circumferential surface of the detecting stator 2 in a radial direction. When the detecting rotor 3 rotates relative to the detecting stator 2, the pulsation of permeance between the detecting rotor 3 and the detecting stator 2 is changed in a sine wave pattern by the presence of the salient poles 31.

A magnetomotive force is generated in each excitation winding 22 by a supply of alternating current power to the excitation winding 22. This generates a magnetic flux that passes through the detecting rotor 3 and the detecting stator core 21. The magnetic flux interlinks the first windings 231 and the second windings 241, thereby generating voltages in the first windings 231 and the second windings 241. The permeance between the detecting rotor 3 and the detecting stator 2 changes in a sine wave pattern based on the rotation angle of the detecting rotor 3, which means that the rotation angle of the detecting rotor 3 is detected by measuring a voltage output from the first windings 231 and a voltage output from the second windings 241.

Conductive wires of the excitation windings 22 are wound around all the teeth 27 at the same number of turns so that the winding directions on the teeth 27 adjacent to each other are opposite from each other. This gives the same radial winding width to every excitation winding 22. This also gives the same radial position to every excitation winding 22.

The first detection winding group 23 is an adjustment winding group including two types of first windings 231, which differ from each other in the radial winding width. In the first detection winding group 23, a plurality of first windings 231 of which the radial winding width is largest of all the first windings 231 are referred to as maximum width windings 231A, and a plurality of first windings 231 out of all first windings 231 that are smaller than the maximum width windings 231A in radial winding width are referred to as non-maximum width windings 231B. A conductive wire of each maximum width winding 231A has a number of turns higher than that of a conductive wire of each non-maximum width winding 231B. The maximum width windings 231A are forward direction windings wound in a forward direction, and the non-maximum width windings 231B are reverse direction windings wound in a direction reverse to the winding direction of the forward direction windings.

In the second detection winding group 24, on the other hand, every second winding 241 has the same radial winding width. This makes the number of turns of a conductive wire the same in every second winding width 241. The conductive wires of the second windings 241 in this example are wound around the teeth 27 having tooth numbers "2", "6", "8", "12" "14", and "18" at the same number of turns, which is equal to or higher than 1. In this example, the conductive wires of the second windings 241 that are wound around the teeth 27 having the teeth numbers "2", "8", and "14" are wound in the same winding direction as the winding direction of the conductive wires of the maximum width windings 231A, and the conductive wires of the second windings 241 that are wound around the teeth 27 having the teeth numbers "6", "12", and "18" are wound in a winding direction reverse to the winding direction of the conductive wires of the second windings 241 that are wound around the teeth 27 having the teeth numbers "2", "8", and "14". In other words, the second windings 241 that are wound around the teeth 27 having the teeth numbers "2", "8", and "14" are forward direction windings and the second windings 241 that are wound around the teeth 27 having the teeth numbers "6", "12", and "18" are reverse direction windings in this example. No first windings 231 and no second windings 241 are wound around the teeth 27 having teeth numbers "4", "10", and "16" in order to distribute the detection windings in a sine wave pattern.

In the first detection winding group 23, the total number of turns of the maximum width windings 231A, which are forward direction windings, and the total number of turns of the non-maximum width windings 231B, which are reverse direction windings, are equal to each other. In the second detection winding group 24, too, the total number of turns of the forward direction windings among the second windings 241 and the total number of turns of the reverse direction windings among the second windings 241 are equal to each other.

The spatial distribution of the number of turns of the first windings 231 and the second windings 241, which are thus wound around the plurality of teeth 27 of the detecting stator core 21, is given as a function expressed by a sine wave that has a spatial order determined in relation to the number of poles (i.e., number of teeth) 2M (M is an integer equal to or larger than 1) of the excitation windings 22 wound around the teeth 27 of the detecting stator core 21 and the number N (N is an integer equal to or larger than 1) of the salient poles 31 of the detecting rotor 3 (i.e., the multiplication factor N of angle).

Each detection winding (i.e., each first winding 231 and each second winding 241) is positioned so that the distance to the core back 26 is closer from the detection winding than from the relevant excitation winding 22. A detection winding (i.e., first winding 231 or second winding 241) and excitation winding 22 wound around the same tooth 27 are arranged so as to be separated from each other in the radial direction of the detecting stator 2.

The insulator 30 includes the plurality of partition portions 301, each of which is interposed between the excitation winding 22 and the detection winding 231 or 241 that are wound around the same tooth 27, and the plurality of protruding portions 302, each of which is interposed between one of the detection windings 231 or one of the detection windings 241 and the core back 26. The excitation windings 22 and the detection windings 231 and 241 are arranged so as to be separated from each other via the partition portions 301 in the radial direction of the detecting stator 2. The detection windings 231 and 241 and the core back 26 are arranged so as to be separated from each other via the protruding portions 302 in the radial direction of the detecting stator 2.

Figure 17:
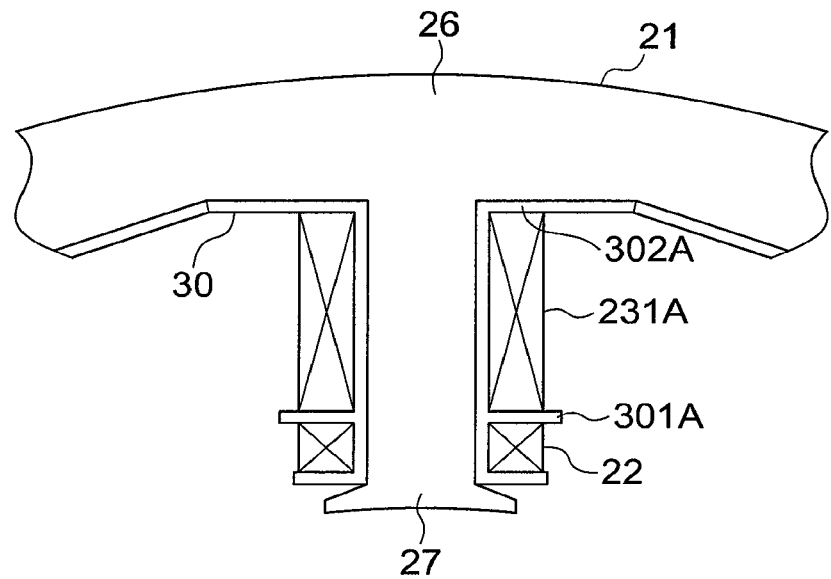
FIG. 17 is an enlarged view for illustrating an excitation winding and maximum width winding wound around one of teeth of FIG. 16 that has a tooth number "1".
Figure 18:
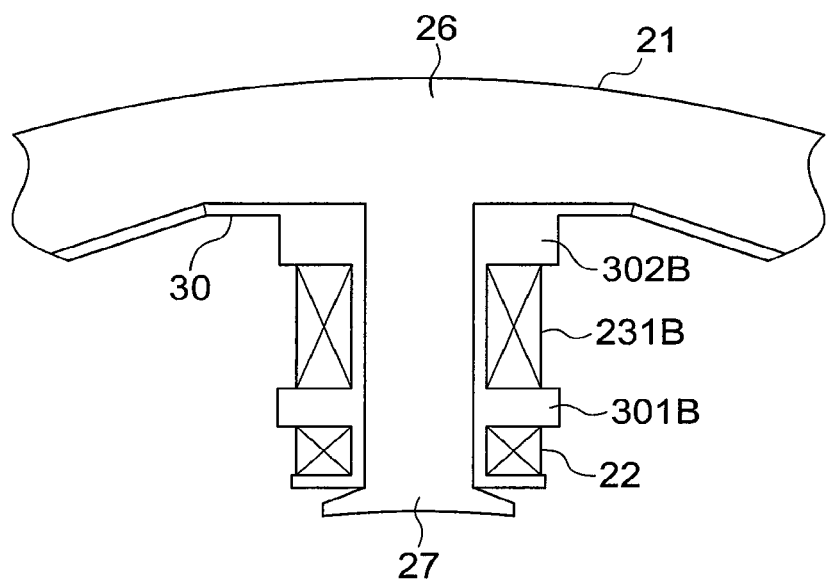
FIG. 18 is an enlarged view for illustrating an excitation winding and non-maximum width winding wound around one of the teeth of FIG. 16 that has a tooth number "3".

FIG. 17 is an enlarged view for illustrating the excitation winding 22 and maximum width winding 231A wound around one of the teeth 27 of FIG. 16 that has a tooth number "1". FIG. 18 is an enlarged view for illustrating the excitation winding 22 and non-maximum width winding 231B wound around one of the teeth 27 of FIG. 16 that has a tooth number "3". The maximum width winding 231A is positioned relative to the excitation winding 22 in the radial direction of the detecting stator 2 by adjusting the thickness of the partition portion 301A and the thickness of the protruding portion 302A as illustrated in FIG. 17. The non-maximum width winding 231B is positioned relative to the excitation winding 22 in the radial direction of the detecting stator 2 by adjusting the thickness of the partition portion 301B and the thickness of the protruding portion 302B as illustrated in FIG. 18. The positional relation between the maximum width winding 231A and the non-maximum width winding 231B when the first detection winding group 23 is viewed along the circumferential direction of the detecting stator 2 is the same as in the first embodiment.

In this example, with the radial winding width of the maximum width winding 231A wider than the radial winding width of the non-maximum width winding 231B, the partition portion 301B is thicker than the partition portion 301A and the protruding portion 302B is thicker than the protruding portion 302A. The rest of the configuration is the same as in the first embodiment.

In this manner, the present invention, when applied to the inner rotor-type resolver 1 in which the detecting rotor 3 is disposed on the inside in the radial direction of the detecting stator 2 and is made rotatable relative to the detecting stator 2, is capable of ensuring the prevention of the accidental unwinding and winding disorder of the excitation windings 22, the first windings 231, and the second windings 241 even more, and can prevent the angle detection error of the resolver 1 from increasing as in the first embodiment and the second embodiment.

The number of teeth 27 of the detecting stator 2 is eighteen and the number of salient poles 31 of the detecting rotor 3 is fifteen in the example described above. However, the combination of the number of teeth 27 and the number of salient poles 31 is not limited thereto, as long as the combination allows the resolver to fulfill its function, as is the case for the combinations described in the first embodiment with reference to FIG. 12.

Fourth Embodiment

Figure 19:
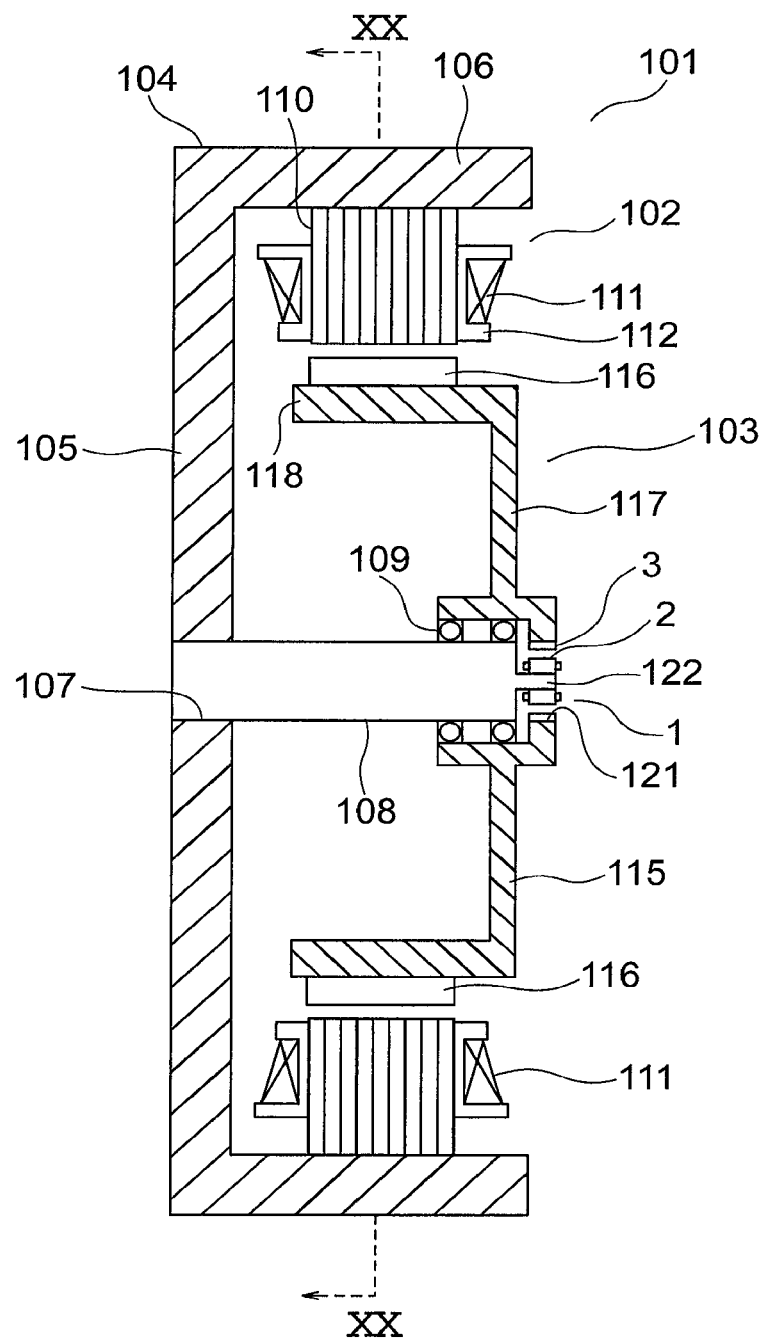
FIG. 19 is a vertical sectional view for illustrating a rotating electrical machine according to a fourth embodiment of the present invention.
Figure 20:
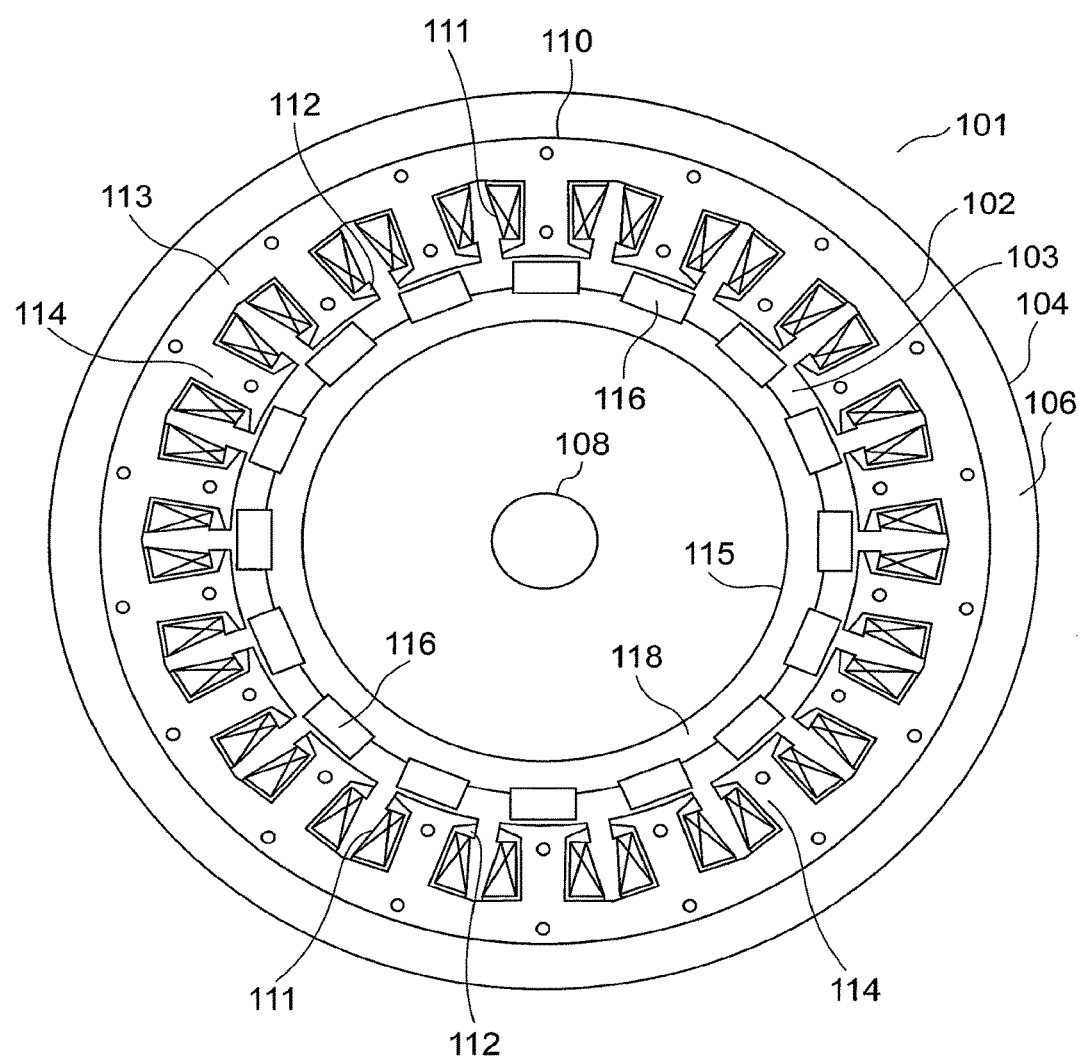
FIG. 20 is a sectional view taken along the line XX-XX of FIG. 19.

FIG. 19 is a vertical sectional view for illustrating a rotating electrical machine according to a fourth embodiment of the present invention. FIG. 20 is a sectional view taken along the line XX-XX of FIG. 19. A rotating electrical machine 101 in FIG. 19 includes a stator 102, which has a ring shape, a rotor 103, which is disposed on the inside of the stator 102 and which is rotatable relative to the stator 102, and a housing 140, which supports the stator 102 and the rotor 103.

The housing 104 includes a housing main body 105, which is shaped like a board, and a housing tube portion 106, which is cylindrical and which is fixed to an outer circumferential portion of the housing main body 105. A through hole 107 is formed in a central portion of the housing main body 105. As illustrated in FIG. 19, a support shaft 108 is fixed to the housing 104. The support shaft 108 is fixed to the housing main body 105 and is disposed along a central axis line of the housing tube portion 106. The rotor 103 is attached to the support shaft 108 via bearings 109 in a rotatable manner. The rotor 103 is supported by the housing 104 via the support shaft 108.

The stator 102 is arranged so as to be coaxial with the rotor 103. The stator 102 includes a stator core 110, which has a ring shape and which surrounds the outer circumference of the rotor 103, a plurality of stator windings 111, which are provided in the stator core 110 and which are aligned side by side in a circumferential direction of the stator core 110, and an insulator 112, which is provided in the stator core 110 to be interposed between the stator core 110 and the stator windings 111. The stator 102 is supported by the housing 104, with the stator core 110 fit inside the housing tube portion 106. The state of insulation between the stator windings 111 and the stator core 110 is ensured by the insulator 112.

The stator core 110 is constructed from a plurality of steel sheets, which are stacked in an axis line direction of the support shaft 108 and which are magnetic bodies. The stator core 110 includes a back yoke portion 113, which has a ring shape along an inner circumferential surface of the housing tube portion 106, and a plurality of magnetic pole tooth portions 114, which protrude from the back yoke portion 113 inward in a radial direction and which are spaced apart from one another in the circumferential direction of the stator core 110. The magnetic pole tooth portions 114 are equally spaced in the circumferential direction of the stator core 110.

The stator windings 111 are provided separately in the magnetic pole tooth portions 114, which means that the stator windings 111 are equally spaced in the circumferential direction of the stator core 110. A rotating magnetic field is generated in the stator 102 by establishing electrical connection to the stator windings 111. The rotor 103 is rotated about the axis line of the support shaft 108 by the generation of the rotating magnetic field in the stator 102.

The rotor 103 includes a rotor yoke 115 and a plurality of permanent magnets (rotor magnetic pole portions) 116 provided in the rotor yoke 115.

The rotor yoke 115 is a mold made of cast iron. The rotor yoke 115 includes, as illustrated in FIG. 19, a rotor yoke main body 117, to which the bearings 109 are attached, and a rotor tube portion 118, which is fixed to an outer circumferential portion of the rotor yoke main body 117 and which is arranged so as to be coaxial with the support shaft 108.

The rotor yoke 115 is disposed on the inside of the stator 102, with an outer circumferential surface of the rotor tube portion 118 facing the stator 102 in a radial direction of the rotor 103. This makes the outer circumferential surface of the rotor tube portion 118 face front end surfaces of the magnetic pole tooth portions 114 in the radial direction.

The permanent magnets 116 are provided on the outer circumferential surface of the rotor tube portion 118. The permanent magnets 116 are spaced apart from one another in a circumferential direction (namely, the rotation direction of the rotor 103) of the rotor 103 in a space between the rotor tube portion 118 and the stator 102. The permanent magnets 116 in this example are equally spaced in the circumferential direction of the rotor 103.

A through hole 121 is formed in a central portion of the rotor yoke main body 117. A resolver shaft 122, which reaches the interior of the through hole 121, is provided in a front end portion of the support shaft 108 so as to be coaxial with the support shaft 108. The resolver shaft 122 is smaller in outer diameter than the support shaft 108.

An outer rotor-type resolver 1 configured to detect the rotation angle of the rotor 103 is provided in the through hole 121 of the rotor yoke main body 117. The resolver 1 includes a detecting stator 2, which is fixed to the resolver shaft 122, and a detecting rotor 3, which faces the detecting stator 2 in a radial direction and which is a magnetic body rotatable relative to the detecting stator 2. The detecting rotor 3 is fixed to an inner surface of the through hole 121 of the rotor yoke main body 117. This causes the detecting rotor 3 to rotate unitarily with the rotor yoke main body 117 and coaxially with the support shaft 108 and the resolver shaft 122. The detecting stator 2 and the detecting rotor 3 have the same configurations as those in the first embodiment.

By applying the present invention to the resolver 1 that is provided in the rotating electrical machine 101 in this manner, the prevention of an increase in detection error can be ensured even more when the rotation angle of the rotor 103 of the rotating electrical machine 101 is detected. The precision of control on the position and number of revolutions of the rotor 103 in the rotating electrical machine 101 can thus be enhanced.

The resolver 1 of the first embodiment is provided in the rotating electrical machine 101 in the example described above. The rotating electrical machine 101 may instead be provided with the resolver 1 of the second embodiment.

In the example described above, the resolver 1 may be applied to the rotating electrical machine 101 functioning as a motor, or the rotating electrical machine 101 functioning as a generator.

Fifth Embodiment

Figure 21:
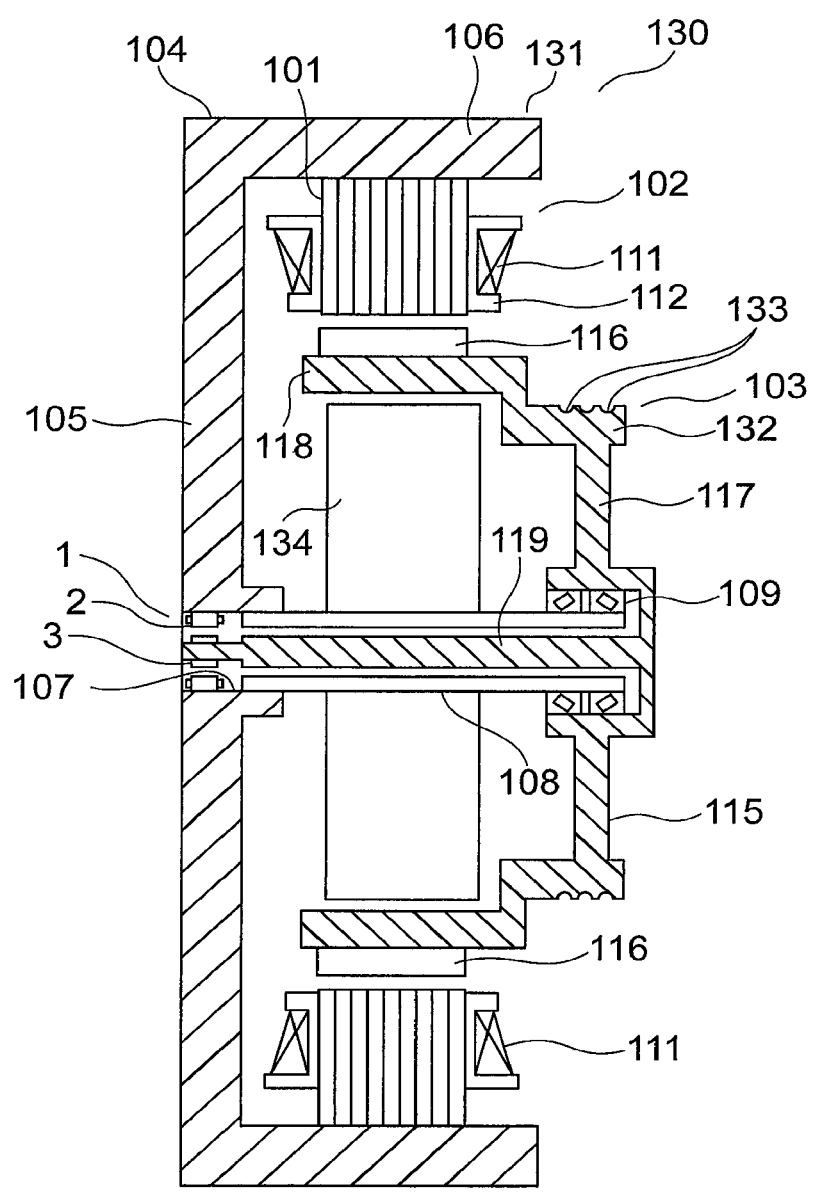
FIG. 21 is a vertical sectional view for illustrating an elevator hoisting machine according to a fifth embodiment of the present invention.

The inner rotor-type resolver 1 according to the third embodiment may be applied to an elevator hoisting machine. FIG. 21 is a vertical sectional view for illustrating an elevator hoisting machine according to a fifth embodiment of the present invention. An elevator hoisting machine 130 in FIG. 21 includes the inner rotor-type resolver 1 according to the third embodiment, a motor 131, and a drive sheave 132, which is rotated by a driving force of the motor 131.

The motor 131 is a rotating electrical machine configured to include a stator 102, which has a ring shape, a rotor 103, which is disposed on the inside of the stator 102 and which is rotatable relative to the stator 102, and a housing 104, which supports the stator 102 and the rotor 103.

A support shaft 108 of the housing 104 is a hollow, that is, tubular shaft of which the interior is communicated to a through hole 107 of a housing main body 105. A rotor yoke 115 of the rotor 103 includes, in addition to a rotor yoke main body 117 and a rotor tube portion 118, a resolver shaft 119, which is fixed to a central portion of the rotor yoke main body 117 and which reaches the interior of the through hole 107 via the interior of the support shaft 108. The rest of the configuration of the motor 131 is the same as the configuration of the rotating electrical machine 101 according to the fourth embodiment.

The inner rotor-type resolver 1 configured to detect the rotation angle of the rotor 103 is provided in the through hole 107 of the housing main body 105. The resolver 1 includes a detecting stator 2, which is fixed to the housing main body 105 inside the through hole 107, and a detecting rotor 3, which faces the detecting stator 2 in a radial direction and which is a magnetic body rotatable relative to the detecting stator 2. The detecting rotor 3 is fixed to the resolver shaft 119. This causes the detecting rotor 3 to rotate unitarily with the rotor 103 about an axis line of the resolver shaft 119 when electrical connection to stator windings 111 is established.

The drive sheave 132 is molded unitarily with the rotor yoke 115. The drive sheave 132 is thus supported by the support shaft 108 via bearings 109 in a manner that allows the drive sheave 132 to rotate freely. The material of the drive sheave 132 and the rotor yoke 115 is cast iron in this example. The drive sheave 132 is provided outside the range of the stator 102 in the direction of an axis line of the support shaft 108. The drive sheave 132 is rotated about the axis line of the support shaft 108 with the rotation of the rotor 103. A plurality of main rope-use grooves 133 are formed in an outer circumferential surface of the drive sheave 132 along a circumferential direction of the drive sheave 132.

A plurality of main ropes from which an elevator car (not shown) and a balance weight (not shown) are hung are wound around the drive sheave 132 along the main rope-use grooves 133. The elevator car and the balance weight are lifted and dropped in a hoistway by the rotation of the drive sheave 132.

A brake device 134 configured to give a braking force to the drive sheave 132 and the rotor 103 is provided in the interior of the rotor tube portion 118. The brake device 134 includes a brake shoe (not shown) capable of displacement in a radial direction of the rotor 103 relative to the rotor tube portion 118. The brake device 134 gives a braking force to the drive sheave 132 and the rotor 103 by bringing the brake shoe into contact with an inner circumferential surface of the rotor tube portion 118, and vanishes the braking force on the drive sheave 132 and the rotor 103 by pulling the brake shoe away from the rotor tube portion 118.

In the thus configured elevator hoisting machine, the inner rotor-type resolver 1 according to the third embodiment is provided in the motor 131, and the same effects as those in the third embodiment can accordingly be obtained. In other words, the position and number of revolutions of the rotor 103 in the rotating electrical machine 101 can be controlled with enhanced precision.

In the example described above, the resolver 1 is provided in the elevator hoisting machine 130 in which the drive sheave 132 is unitary with the rotor 103. The resolver 1 may instead be provided in a geared hoisting machine (elevator hoisting machine) in which a gear device including a plurality of interlocking gears is installed in a motor serving as a rotating electrical machine, so that the rotation of a rotor included in the motor is transmitted to the drive sheave 132 through the gear device. The drive sheave 132 in this case is rotated with the rotation of the rotor included in the motor, at a number of revolutions reduced from the number of revolutions of the rotor by a certain gear ratio.

In the example described above, the rotating electrical machine 101 according to the fourth embodiment may be applied as the motor 131 to the elevator hoisting machine. When the rotating electrical machine 101 according to the fourth embodiment is applied as the motor 131 to the elevator hoisting machine, the outer rotor-type resolver 1 according to the first embodiment or the second embodiment is provided in the motor 131.

In the fourth embodiment, the inner rotor-type resolver 1 according to the third embodiment may be provided in a rotating electrical machine having the same configuration as the configuration of the motor 131 in the fifth embodiment.

In the fourth embodiment and the fifth embodiment, the present invention is applied to an inner rotor-type rotating electrical machine in which the ring-shaped stator 102 surrounds the outer circumference of the rotor 103. The present invention may instead be applied to an outer rotor-type rotating electrical machine in which the ring-shaped rotor 103 surrounds the outer circumference of the stator 102.

In the fourth embodiment and the fifth embodiment, the resolver 1 is provided in a permanent magnet motor in which the permanent magnets 116 are included in the rotor 103. The present invention is not limited thereto, and the resolver 1 may be provided in, for example, an induction motor.

In the respective embodiments described above, the first windings 231 serve as COS phase detection windings and the second windings 241 serve as SIN phase detection windings. However, the first windings 231 may be used as the SIN phase detection windings and the second windings 241 may be used as COS the phase detection windings.

In the respective embodiments described above, two types of first windings 231, which are different from each other in radial winding width, are included in the first detection winding group 23. However, the first detection winding group 23 may include three or more types of first windings 231, which are different from one another in radial winding width. In this case, a plurality of first windings 231 of one type each having a maximum radial winding width are defined as maximum width windings, and a plurality of first windings 231 of other types that are narrower in winding width than the maximum width windings in radial winding width are defined as non-maximum width windings. Further, in this case, through the adjustment of the respective radial positions of the first windings 231 of each type are adjusted so that the entire radial winding width of each non-maximum width windings falls within the radial winding width of the maximum width windings when the first detection winding group 23 is viewed along the circumferential direction of the detecting stator 2.

In the respective embodiments described above, the first detection winding group 23 is used as an adjustment winding group including a plurality of types of detection windings each having a different radial winding width. However, the second detection winding group 24 may be used as the adjustment detection winding group. In this case, the types of the radial winding widths of the respective second windings 241, which are included in the second detection winding group 24, may be two types, or three or more types.

In the respective embodiments described above, as the first detection winding group 23, the adjustment winding group, which includes a plurality of types of the first detection windings 231 different from one another in radial winding width, is used. However, the respective first windings 231 included in the first detection winding group 23 may have the same radial winding width. Even employing this configuration, there may be avoided a case in which the excitation winding 22, the first winding 231, and the second winding 241 are all wound around the same tooth 27, and winding collapses and winding fluctuations of the windings 22, 231, and 241 on the teeth 27 can accordingly be suppressed. In other words, the present invention can be applicable to a case in which the number of turns is varied, and to a case in which the same winding width is used, too, when two or more winding widths are used.

In the example described above, the present invention is applied to the variable reluctance-type resolver. The present invention may be applied to the rotary transformer-type resolver.

The invention claimed is:
1. A resolver, comprising:
a detecting stator; and
a detecting rotor rotatable relative to the detecting stator,
the detecting rotor including a plurality of salient poles arranged side by side in a circumferential direction, and being arranged so that each of the plurality of salient poles face the detecting stator in a radial direction,
the detecting stator including a detecting stator core, and a first detection winding group, a second detection winding group, and a plurality of excitation windings, which are provided to the detecting stator core,
the detecting stator core including a plurality of teeth arranged side by side in the circumferential direction,
the first detection winding group including a plurality of first windings as detection windings,
the second detection winding group including, as detection windings, a plurality of second windings different from the plurality of first windings in a phase of a detection voltage,
each of the plurality of excitation windings being wound around each one of the plurality of teeth,
each of the plurality of first windings and each of the plurality of second windings being wound around different ones of the plurality of teeth from each other without being wound around the same tooth,
each of the detection windings and each of the plurality of excitation windings wound around the same tooth being arranged to be separated from each other in the radial direction,
at least one of the first detection winding group and the second detection winding group being an adjustment winding group, the adjustment winding group including the detection windings of a plurality of types different from one another in winding width in a radial direction of the detecting stator,
wherein, in the adjustment winding group, the detection windings each having a maximum winding width are defined as maximum width windings, and the detection windings that are narrower in winding width than the maximum width windings are defined as non-maximum width windings,
a winding direction of conductive wires of the maximum width windings and a winding direction of conductive wires of the non-maximum width windings are different from each other,
a range of the winding width of each of the non-maximum width windings falling within a range of the winding width of each of the maximum width windings in a radial direction of the detecting stator when the detecting stator is viewed along the circumferential direction.

2. A resolver according to claim 1, wherein the number of the non-maximum width windings is larger than the number of the maximum width windings.

3. A resolver according to claim 1, wherein positions of the plurality of excitation windings match with each other in the radial direction of the detecting stator when viewed along the circumferential direction of the detecting stator.

4. A resolver according to claim 1,
wherein each of the plurality of excitation windings is wound around one of the plurality of teeth so that conductive wires of the excitation windings on adjacent teeth are wound in directions opposite from each other,
wherein the plurality of first windings each are wound around teeth that are selected every other tooth in the circumferential direction out of the plurality of teeth and
wherein the plurality of second windings are wound around at least one of the plurality of teeth that is not wound with any of the plurality of first windings.

5. A resolver according to claim 1, wherein a center position of the non-maximum width winding matches with a center position of the maximum width winding in the radial direction of the detecting stator when the detecting stator is viewed along the circumferential direction.

6. A resolver according to claim 1,
wherein at least one of the first detection winding group and the second detection winding group includes forward direction windings, which are the detection windings wound in a forward direction, and reverse direction windings, which are the detection windings wound in a reverse direction, and
wherein a total number of turns of the forward direction windings and a total number of turns of the reverse direction windings are equal to each other.

7. A resolver according to claim 1,
wherein the detecting stator further includes a non-magnetic body interposed between the plurality of the excitation windings and the plurality of teeth, and between the detection windings and the plurality of teeth, and
wherein the non-magnetic body includes a partition portion interposed between the excitation winding and detection winding wound around the same tooth.

8. A resolver, comprising:
a detecting stator; and
a detecting rotor rotatable relative to the detecting stator,
the detecting rotor including a plurality of salient poles arranged side by side in a circumferential direction, and being arranged so that each of the plurality of salient poles face the detecting stator in a radial direction,
the detecting stator including a detecting stator core, and a first detection winding group, a second detection winding group, and a plurality of excitation windings, which are provided to the detecting stator core,
the detecting stator core including a plurality of teeth arranged side by side in the circumferential direction,
the first detection winding group including a plurality of first windings as detection windings,
the second detection winding group including, as detection windings, a plurality of second windings different from the plurality of first windings in a phase of a detection voltage,
each of the plurality of excitation windings being wound around each one of the plurality of teeth,
each of the plurality of first windings and each of the plurality of second windings being wound around different ones of the plurality of teeth from each other without being wound around the same tooth,
each of the detection windings and each of the plurality of excitation windings wound around the same tooth being arranged to be separated from each other in the radial direction,
a number of pole pairs of the plurality of excitation windings being M, which is an integer equal to or larger than 1,
a number of the salient poles being N, which is an integer equal to or larger than 1,
spatial distributions of number of turns of the plurality of first windings and the plurality of second windings being obtained from a sum of functions expressed by a sine wave of $(|M\pm N|)$-th spatial order and functions expressed by a sine wave of $(|M-|M\pm N||)$-th spatial order, the sine wave of the $(|M-|M\pm N||)$-th spatial order having an amplitude equal to an amplitude of the sine wave of the $(|M\pm N|)$-th spatial order,
the number of pole pairs M of the plurality of excitation windings being 9, and
the number of salient poles N being one of 15, 24, and 30.

9. A resolver according to claim 8,
wherein at least one of the first detection winding group and the second detection winding group includes forward direction windings, which are the detection windings wound in a forward direction, and reverse direction windings, which are the detection windings wound in a reverse direction, and
wherein a total number of turns of the forward direction windings and a total number of turns of the reverse direction windings are equal to each other.

10. A resolver according to claim 8,
wherein the detecting stator further includes a non-magnetic body interposed between the plurality of the excitation windings and the plurality of teeth, and between the detection windings and the plurality of teeth, and
wherein the non-magnetic body includes a partition portion interposed between the excitation winding and detection winding wound around the same tooth.

11. A resolver, comprising:
a detecting stator; and
a detecting rotor rotatable relative to the detecting stator,
the detecting rotor including a plurality of salient poles arranged side by side in a circumferential direction, and being arranged so that each of the plurality of salient poles face the detecting stator in a radial direction,
the detecting stator including a detecting stator core, and a first detection winding group, a second detection winding group, and a plurality of excitation windings, which are provided to the detecting stator core,
the detecting stator core including a plurality of teeth arranged side by side in the circumferential direction, the first detection winding group including a plurality of first windings as detection windings, the second detection winding group including, as detection windings, a plurality of second windings different from the plurality of first windings in a phase of a detection voltage, each of the plurality of excitation windings being wound around each one of the plurality of teeth, each of the plurality of first windings and each of the plurality of second windings being wound around different ones of the plurality of teeth from each other without being wound around the same tooth, each of the detection windings and each of the plurality of excitation windings wound around the same tooth being arranged to be separated from each other in the radial direction, a number of pole pairs of the plurality of excitation windings being M, which is an integer equal to or larger than 1, a number of the salient poles being N, which is an integer equal to or larger than 1, spatial distributions of number of turns of the plurality of first windings and the plurality of second windings being obtained from a sum of functions expressed by a sine wave of ($|M\pm N|$)-th spatial order and functions expressed by a sine wave of ($|M-|M\pm N||$)-th spatial order, the sine wave of the ($|M-|M\pm N||$)-th spatial order having an amplitude equal to an amplitude of the sine wave of the ($|M\pm N|$)-th spatial order, the number of pole pairs M of the plurality of excitation windings being 15, and the number of salient poles N being one of 10 and 20.

12. A resolver according to claim 11, wherein at least one of the first detection winding group and the second detection winding group includes forward direction windings, which are the detection windings wound in a forward direction, and reverse direction windings, which are the detection windings wound in a reverse direction, and wherein a total number of turns of the forward direction windings and a total number of turns of the reverse direction windings are equal to each other.

13. A resolver according to claim 11, wherein the detecting stator further includes a non-magnetic body interposed between the plurality of the excitation windings and the plurality of teeth, and between the detection windings and the plurality of teeth, and wherein the non-magnetic body includes a partition portion interposed between the excitation winding and detection winding wound around the same tooth.

14. A rotating electrical machine, comprising:

a stator;

a rotor rotatable relative to the stator; and the resolver of claim 1, wherein the detecting rotor is rotated unitarily with the rotor.

15. An elevator hoisting machine, comprising:

a motor including: a stator; a rotor rotatable relative to the stator; and the resolver of claim 1; and a drive sheave rotated in association with rotation of the rotor, wherein the detecting rotor is rotated unitarily with the rotor.

16. A rotating electrical machine, comprising:

a stator;

a rotor rotatable relative to the stator; and the resolver of claim 8, wherein the detecting rotor is rotated unitarily with the rotor.

17. An elevator hoisting machine, comprising:

a motor including: a stator; a rotor rotatable relative to the stator; and the resolver of claim 8; and a drive sheave rotated in association with rotation of the rotor, wherein the detecting rotor is rotated unitarily with the rotor.

18. A rotating electrical machine, comprising:

a stator;

a rotor rotatable relative to the stator; and the resolver of claim 11, wherein the detecting rotor is rotated unitarily with the rotor.

19. An elevator hoisting machine, comprising:

a motor including: a stator; a rotor rotatable relative to the stator; and the resolver of claim 11; and a drive sheave rotated in association with rotation of the rotor, wherein the detecting rotor is rotated unitarily with the rotor.

* * * * *